(12) United States Patent
Kawai

(10) Patent No.: US 10,942,424 B2
(45) Date of Patent: Mar. 9, 2021

(54) CAMERA BODY AND INTERCHANGEABLE LENS

(71) Applicant: NIKON CORPORATION, Tokyo (JP)

(72) Inventor: Akihiko Kawai, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 16/505,859

(22) Filed: Jul. 9, 2019

(65) Prior Publication Data

US 2020/0026153 A1  Jan. 23, 2020

(30) Foreign Application Priority Data

Jul. 20, 2018 (JP) .............................. JP2018-137265

(51) Int. Cl.
  *G03B 17/14* (2006.01)
  *G03B 7/14* (2006.01)
  *G02B 7/14* (2021.01)

(52) U.S. Cl.
  CPC ............... *G03B 17/14* (2013.01); *G02B 7/14* (2013.01)

(58) Field of Classification Search
  None
  See application file for complete search history.

(56) References Cited

U.S. PATENT DOCUMENTS

| | | | |
|---|---|---|---|
| 4,963,910 A | 10/1990 | Ishimura | |
| 2006/0098114 A1* | 5/2006 | Horii | H04N 5/2254 348/360 |
| 2011/0279654 A1 | 11/2011 | Ueda et al. | |
| 2013/0028590 A1 | 1/2013 | Hasuda et al. | |
| 2020/0007724 A1* | 1/2020 | Nakagawara | H04N 5/2254 |
| 2020/0026153 A1* | 1/2020 | Kawai | G03B 17/565 |
| 2020/0026154 A1* | 1/2020 | Kawai | G02B 7/14 |
| 2020/0073209 A1* | 3/2020 | Fujihashi | G03B 17/565 |
| 2020/0252538 A1* | 8/2020 | Oikawa | H04N 5/23209 |

FOREIGN PATENT DOCUMENTS

| | | |
|---|---|---|
| JP | S63-38926 A | 2/1988 |
| JP | S63-200132 A | 8/1988 |

OTHER PUBLICATIONS

Mar. 5, 2019 Office Action issued in Japanese Patent Application No. 2018-137265.
Sep. 6, 2019 Search Report issued in European Patent Application No. 19186249.9.
English Translation of Mar. 5, 2019 Office Action issued in Japanese Patent Application No. 2018-137265.

* cited by examiner

*Primary Examiner* — William B Perkey
(74) *Attorney, Agent, or Firm* — Oliff PLC

(57) ABSTRACT

A camera body at which one or more camera accessories, at which light from a subject enters, are detachably mountable, includes: a body-side terminal; and a communication unit that communicates with at least one of the camera accessories, wherein: the communication unit requests, via the body-side terminal, the camera accessory for a discriminating signal indicating whether or not another camera accessory capable of communicating with the camera body is mountable on a subject side of the camera accessory.

11 Claims, 9 Drawing Sheets

CAMERA BODY AND INTERCHANGEABLE LENS

INCORPORATION BY REFERENCE

The disclosure of the following priority application is herein incorporated by reference: Japanese Patent Application No. 2018-137265 filed Jul. 20, 2018

TECHNICAL FIELD

The present invention relates to a camera body and an interchangeable lens.

BACKGROUND ART

Camera accessories include a master lens via which a subject image can be formed and an intermediate accessory that can be mounted between the master lens and a camera body (see PTL 1). In order to ensure that the master lens and the intermediate accessory are distinguishable from each other by the camera body, it is necessary in the related art to dispose terminals at the master lens in a quantity different from the number of terminals at the intermediate accessory.

CITATION LIST

Patent Literature

PTL 1: Japanese Laid Open Patent Publication No. S63-38926

SUMMARY OF INVENTION

According to a first aspect of the present invention, a camera body at which one or more camera accessories, at which light from a subject enters, are detachably mountable, comprises: a body-side terminal; and a communication unit that communicates with at least one of the camera accessories, wherein: the communication unit requests, via the body-side terminal, the camera accessory for a discriminating signal indicating whether or not another camera accessory capable of communicating with the camera body is mountable on a subject side of the camera accessory.

According to a second aspect of the present invention, an interchangeable lens that is detachably mountable at a camera body, comprises: an optical system at which light from a subject enters; and a reception unit that receives an instruction signal transmitted from the camera body, wherein: the instruction signal carries an identifier used to identify the interchangeable lens and an instruction issued from the camera body.

DESCRIPTION OF EMBODIMENTS

The following is an explanation of an embodiment of the present invention, given in reference to drawings.

Figure 1:
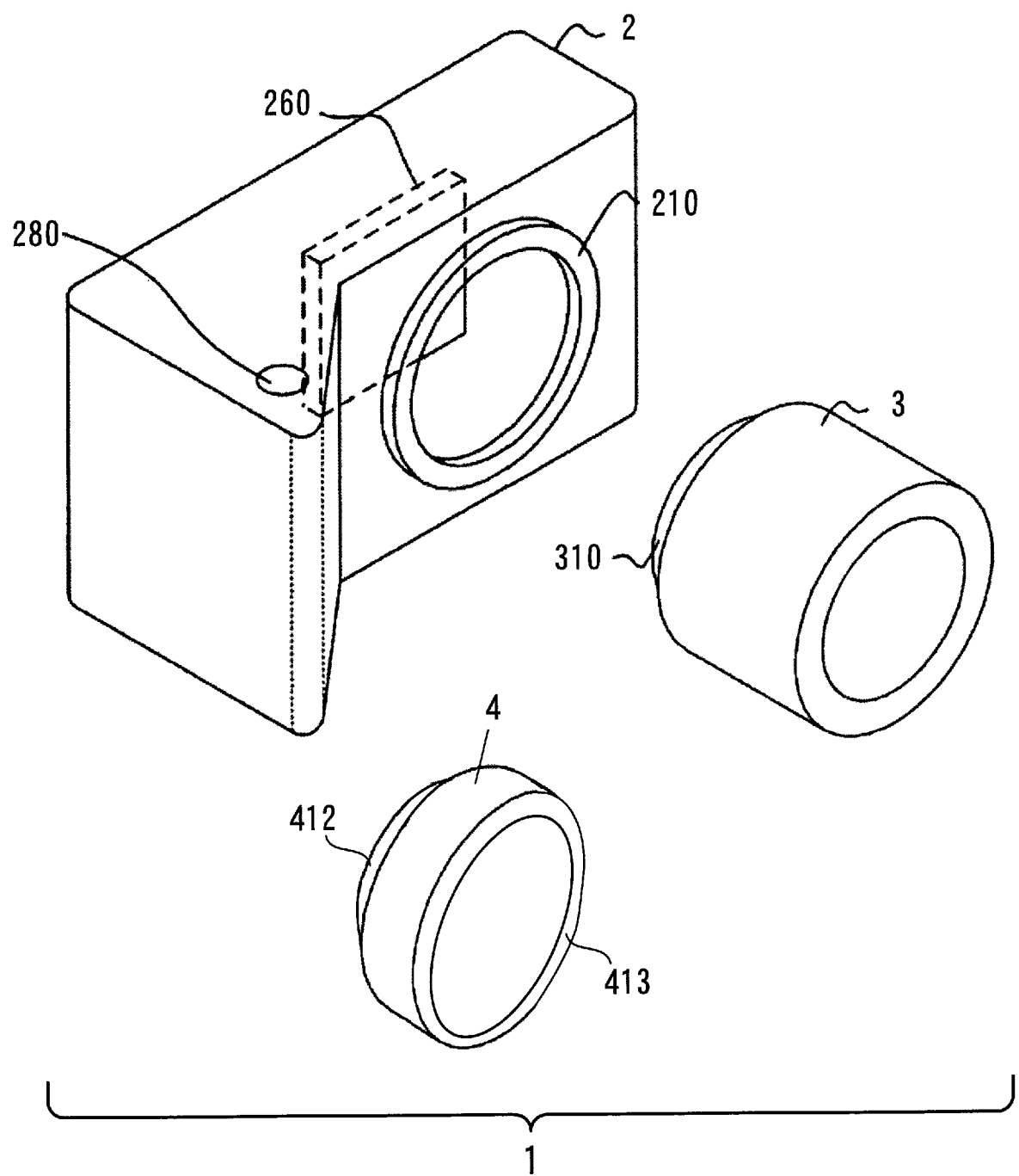
FIG. 1 is a perspective presenting an example of a camera system.
Figure 2:
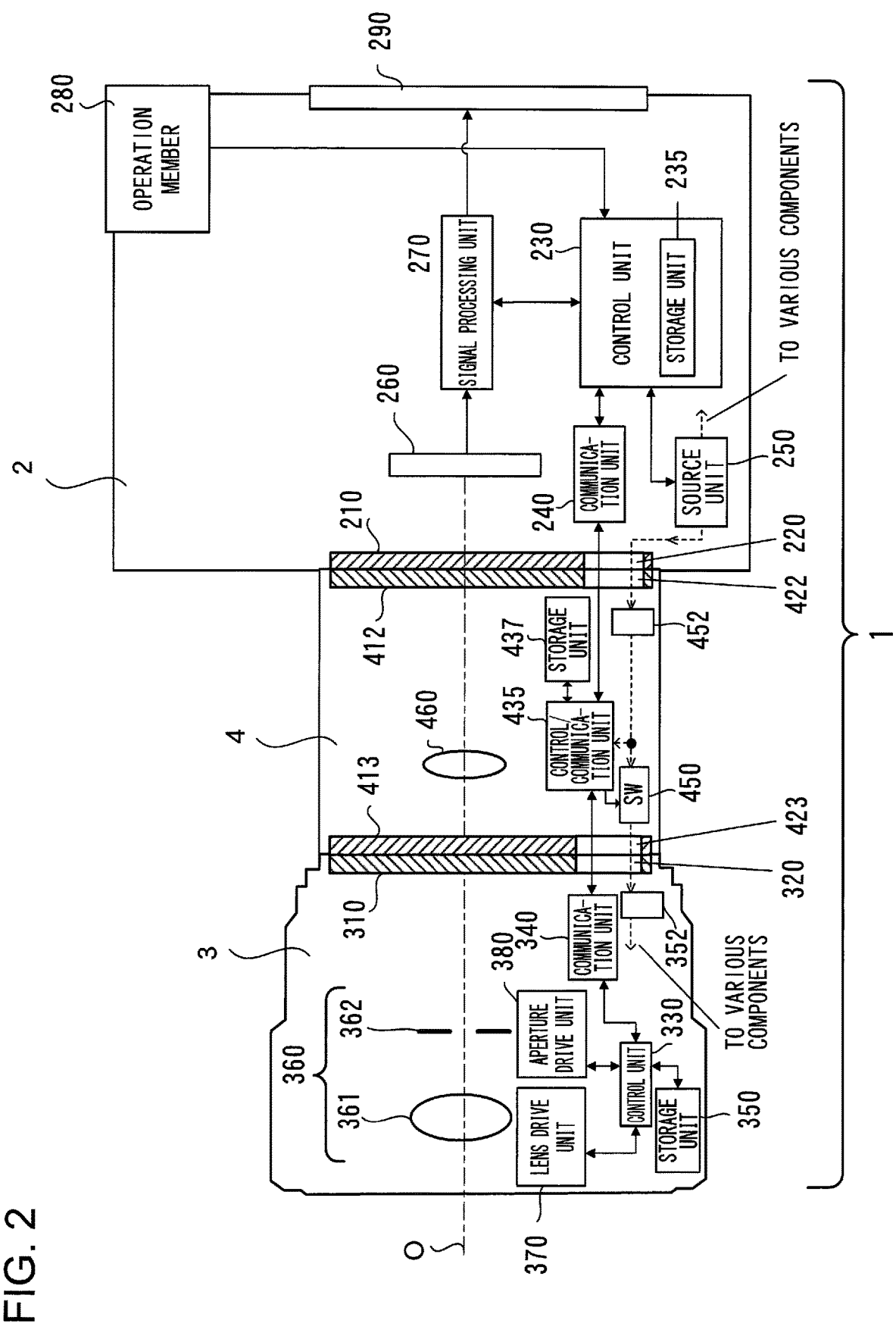
FIG. 2 is a block diagram showing the essential structure of a camera system that includes a teleconverter.

In FIG. 1 showing a camera system 1 achieved in an embodiment of the present invention in a perspective, camera accessories are yet to be mounted at a camera body 2. FIG. 2 is a block diagram of the essential structure of the camera system 1.

The camera accessories in the embodiment include an interchangeable lens 3 used as a master lens and a teleconverter 4, which is an intermediate accessory. The term "master lens" used in the description of the embodiment refers to a device mounted at the camera body 2, via which a subject image can be formed. In addition, the term "master lens" used in the description of the embodiment refers to a device on the subject side of which another camera accessory in a communication-enabled state is not mounted. The term "intermediate accessory" used in the description of the embodiment refers to a device on the subject side of which another device can be mounted in a communication-enabled state. Such an intermediate accessory may be otherwise referred to as a non-master lens. A non-master lens is utilized in combination with the master lens.

A bayonet structure, adopted at a body-side mount and at a lens-side mount, makes it possible to couple the camera body 2 with a camera accessory and to couple a camera accessory with another camera accessory. This means that a body-side mount 210 at the camera body 2 and a front-side mount 413 disposed on the lens-side of the teleconverter 4 have shapes substantially identical to each other and that a lens-side mount 310 at the interchangeable lens 3 and a rear-side mount 412 disposed on the body-side of the teleconverter 4 have shapes substantially identical to each other. Thus, the interchangeable lens 3 can be directly mounted at the camera body 2 without the teleconverter 4 present between the camera body 2 and itself, and it can also be indirectly mounted at the camera body 2 via the teleconverter 4. As the camera body 2 and a camera accessory become coupled with each other or a camera accessory becomes coupled with another camera accessory, terminals disposed at the mounts come into physical contact with each other, thereby achieving an electrical connection.

Interchangeable Lens

The interchangeable lens 3 includes the lens-side mount 310, a lens-side control unit 330, a lens-side communication unit 340, a lens-side storage unit 350, a lens-side source circuit 352, an image-capturing optical system 360, a lens drive unit 370 and an aperture drive unit 380.

At the lens-side mount 310 having an annular shape, a lens-side terminal holding unit 320 is disposed. A plurality of lens-side terminals or contacts are disposed so as to form a circular arc centered on the optical axis at the lens-side terminal holding unit 320. The plurality of lens-side terminals include, for instance, a mount detection terminal via which a signal indicating that the interchangeable lens 3 has been mounted at the camera body 2 is transmitted to the camera body 2, a communication terminal via which communication is carried out between the interchangeable lens 3 and the camera body 2, a power supply terminal via which electric power is provided from the camera body 2 to the interchangeable lens 3 and a ground terminal.

When the exchangeable lens 3 is mounted at the camera body 2 via the teleconverter 4, signals and power provided via the various terminals are transmitted from the interchangeable lens 3 to the camera body 2 via the teleconverter 4. In addition, when the interchangeable lens 3 is directly mounted at the camera body 2, they are directly transmitted from the interchangeable lens 3 to the camera body 2.

The lens-side control unit 330 is constituted with a microcomputer, its peripheral circuits and the like. The lens-side control unit 330 controls various components of the interchangeable lens 3 by executing a control program stored in the lens-side storage unit 350. In addition, in response to a request issued from the camera body 2, the lens-side control unit 330 reads out data stored in the lens-side storage unit 350 and transmits the data thus read out to the camera body 2 from the lens-side communication unit 340, either via the teleconverter 4 or directly. The lens-side control unit 330 is connected to the lens-side communication unit 340, the lens-side storage unit 350, the lens drive unit 370 and the aperture drive unit 380.

The lens-side communication unit 340 carries out specific communication, either via the teleconverter 4 or directly, with a body-side communication unit 240, based upon an instruction issued by the body-side communication unit 240. The lens-side communication unit 340 is connected with the lens-side control unit 330 and the communication terminal mentioned earlier. Through the communication carried out between the body-side communication unit 240 and the lens-side communication unit 340, instructions, such as a drive instruction for driving a lens 361 and information requests including a transmission request for data stored in the lens-side storage unit 350, which are to be described later, are transmitted from the camera body 2, either via the teleconverter 4 or directly, to the interchangeable lens 3. In addition, based upon an instruction issued from the body-side communication unit 240, information indicating the state within the interchangeable lens 3, e.g., the position to which the lens 361 has been moved, or data read out from the lens-side storage unit 350 are transmitted from the interchangeable lens 3, either via the teleconverter 4 or directly, to the camera body 2.

The lens-side storage unit 350 is constituted with a non-volatile storage medium. Data recording into and data readout from the lens-side storage unit 350 are controlled the lens-side control unit 330. In addition to the control program executed by the lens-side control unit 330 and the like, data indicating the model name of the interchangeable lens 3 (may be otherwise referred to as model name information), data indicating the optical characteristics of the image-capturing optical system 360, data indicating a device ID and the like can be stored in the lens-side storage unit 350. A device ID, which is an identifier that enables the camera body 2 to identify a camera accessory mounted thereat, is data constituted with signs and the like used to specify a communication partner among camera accessories mounted at the camera body 2. A device ID is transmitted from the camera body 2 each time the interchangeable lens 3 is mounted at the camera body 2 (or each time a mounted state is detected). The lens-side storage unit 350 is connected with the lens-side control unit 330.

The source circuit 352 distributes electric power from the camera body 2 to the interchangeable lens 3 via the power supply terminal, to various components within the interchange lens 3. The source circuit 352 is connected with the power supply terminal mentioned above.

The image-capturing optical system 360 forms a subject image onto an image-capturing surface either via the teleconverter 4 or directly. An optical axis O of the image-capturing optical system 360 is substantially in alignment with the centers of the lens-side mount 310, the front-side mount 413 of the teleconverter 4, the rear-side mount 412 of the teleconverter 4, the body-side mount 210 and the image-capturing surface. The image-capturing optical system 360 is configured with a plurality of lenses 361 including, for instance, a focusing lens and a zoom lens, and an aperture 362. At least one of the plurality of lenses 361 is structured so as to be allowed to move, either driven by the lens drive unit 370 or in response to a manual operation, along the optical axis O. The positions taken by the individual lenses along the optical axis O can be detected via an encoder or the like included in the lens drive unit 370.

The amount of light to enter an image sensor 260 is adjusted via the aperture 362. The aperture 362 is structured so as to be able to alter the aperture stop diameter (aperture number) as it is driven by the aperture drive unit 380 or in response to a manual operation. The aperture stop diameter at the aperture 362 can be detected via an encoder or the like included in the aperture drive unit 380.

The lens drive unit 370 may be configured with, for instance, a motor and a lens drive mechanism. The lens drive unit 370 causes the focusing lens among the lenses 361 to move along the optical axis O based upon an instruction issued by the lens-side control unit 330. The lens drive unit 370 is connected with the lens-side control unit 330.

The aperture drive unit 380 is constituted with, for instance, a motor and an aperture drive mechanism. The aperture drive unit 380 alters the aperture stop diameter at the aperture 362 based upon an instruction issued by the lens-side control unit 330. The aperture drive unit 380 is connected with the lens-side control unit 330.

Teleconverter 4

The teleconverter 4 includes the rear-side mount 412 that faces opposite the body-side mount 210 when the teleconverter 4 is mounted at the camera body 2, the front-side mount 413 that faces opposite the lens-side mount 310 when the interchangeable lens 3 is mounted thereat, an accessory-side control/communication unit 435, an accessory-side storage unit 437, a switch 450, an accessory-side source circuit 452 and a lens 460.

At the rear-side mount 412, a rear-side terminal holding unit 422 having a plurality of terminals or contacts disposed thereat so as to form a circular arc centered on the optical axis, is disposed. At the front-side mount 413, a front-side terminal holding unit 423 having a plurality of terminals or contacts disposed thereat so as to form a circular arc centered on the optical axis, is disposed. The plurality of terminals disposed at the rear-side terminal holding unit 422 and at the front-side terminal holding unit 423 include a mount detection terminal via which a signal indicating that the camera accessory has been mounted is transmitted, a communication terminal via which the camera accessory carries out communication with the camera body 2, a power supply terminal via which electric power is provided from the camera body 2 to the camera accessory and the ground terminal. The terminals included in the rear-side terminal holding unit 422 located on the rear-side (toward the camera body 2) of the intermediate accessory are identical to the terminals included in the lens-side terminal holding unit 320 at the lens-side mount 310. In addition, the terminals included in the front-side terminal holding unit 423 on the front side (toward the subject) of the intermediate accessory are identical to the terminals included in the body-side terminal holding unit 220 at the body-side mount 210.

The accessory-side control/communication unit 435 is constituted with a microcomputer, a storage unit, their peripheral circuits and the like. The accessory-side control/communication unit 435 executes open/close control of the switch 450 by executing a control program stored in the accessory-side storage unit 437. As the switch 450 is closed, electric power provided from the camera body 2 to the source circuit 452 is supplied to the interchangeable lens 3, whereas as the switch 450 opens, the power supply to the interchangeable lens 3 is cut off. In addition, the accessory-side control/communication unit 435 carries out predetermined communication with the body-side communication unit 240. Furthermore, in response to a request issued from the camera body 2, the accessory-side control/communication unit 435 reads out data stored in the accessory-side storage unit 437 and transmits the data thus read out to the camera body 2. Moreover, the accessory-side control/communication unit 435 controls operations, detections and the like executed in the teleconverter 4 in response to instructions issued from the camera body 2. The accessory-side control/communication unit 435 is connected with the communication terminal and the switch 450 mentioned above.

Data recording into and data readout from the accessory-side storage unit 437 are controlled by the accessory-side control/communication unit 435. In addition to the control program executed by the accessory-side control/communication unit 435 and the like, data indicating the model name of the teleconverter 4 (may otherwise be referred to as model name information), data indicating a device ID and the like can be stored in the accessory-side storage unit 437. The accessory-side storage unit 437 is connected with the accessory-side control/communication unit 435.

The switch 450 is a semiconductor switch element that may be constituted with, for instance, an FET (field effect transistor). An ON/OFF state at the switch 450 is controlled based upon a control signal input to the switch 450 from the accessory-side control/communication unit 435. When the switch is in an OFF state, the contact point is open, whereas when the switch is in an ON state, the contact point is closed. The switch 450 enters an OFF state when a high-level (hereafter notated as an "H" level) control signal is not input thereto from the accessory-side control/communication unit 435 i.e., when a low-level (hereafter notated as an "L" level) control signal is input thereto, whereas it enters an ON state when an H level control signal is input thereto from the accessory-side control/communication unit 435. The switch 450 is connected with the source circuit 452, the power supply terminal among second terminals, and the accessory-side control/communication unit 435.

The source circuit 452 distributes electric power provided to the teleconverter 4 via the body-side power supply terminal and the ground terminal, to the various components within the teleconverter 4 or to the interchangeable lens 3. The source circuit 452 is connected to the power supply terminal and the switch 450.

The lens 460 is a teleconverter lens that converts the focal length of the lenses 361 by, for instance, a factor of 1.4. Thus, when the teleconverter 4 is mounted at the interchangeable lens 3, the focal length of the interchangeable lens 3 is increased by a factor of 1.4 over the focal length achieved without the teleconverter 4 mounted thereat.

Camera Body

The camera body 2 includes the body-side mount 210, a body-side control unit 230, a body-side communication unit 240, a source unit 250, the image sensor 260, a signal processing unit 270, an operation member 280 and a display unit 290.

The body-side terminal holding unit 220 is disposed at the body-side mount 210 having an annular shape. A plurality of body-side terminals are held in the body-side terminal holding unit 220. The plurality of body-side terminals include, for instance, a mount detection terminal via which a signal indicating that the interchangeable lens 3 has been mounted at the camera body 2 is transmitted to the camera body 2 either via the teleconverter 4 or directly, a communication terminal via which communication is carried out between the camera body 2 and the teleconverter 4 or the interchangeable lens 3, a power supply terminal via which electric power is provided from the camera body 2 to the teleconverter 4 or the interchangeable lens 3, and a ground terminal.

The body-side control unit 230 is configured with a microcomputer, its peripheral circuits and the like. The body-side control unit 230 controls various components disposed inside the camera body 2 by executing a control program stored in a storage unit 235. The body-side control unit 230 is connected with the body-side communication unit 240, the source unit 250, the image sensor 260, the signal processing unit 270, the operation member 280, the display unit 290 and the mount detection terminal mentioned above.

The body-side control unit 230 includes the storage unit 235. Data recording into and data readout from the storage unit 235 are controlled by the body-side control unit 230. In addition to the control program executed by the body-side control unit 230 and the like, camera accessory model name information, data indicating the optical characteristics of camera accessories, and the like can be stored in the storage unit 235. Furthermore, as a camera accessory is mounted, the body-side control unit 230 assigns a device ID, as will be explained later, and holds the device ID for temporary storage after it is transmitted to the camera accessory. The information indicating the device ID held by the body-side control unit 230 is erased in response to a power-off operation or as the camera accessory is dismounted.

The body-side communication unit 240 carries out the communication mentioned earlier with the lens-side communication unit 340 or with the accessory-side control/communication unit 435. The body-side communication unit 240 is connected with the body-side control unit 230 and the communication terminal mentioned above.

The source unit 250 converts the voltage at a battery (not shown) to a voltage to be used at the various units of the camera system 1 and supplies the voltage resulting from the conversion to the various components in the camera body 2, the interchangeable lens 3 and the teleconverter 4. The source unit 250 is able to switch on/off power supply to each power recipient in response to an instruction issued by the body-side control unit 230. The source unit 250 is connected with the body-side control unit 230 and the power supply terminal mentioned above.

The image sensor 260 is a solid-state image sensor such as a CMOS image sensor or a CCD image sensor. In response to a control signal provided by the body-side control unit 230, the image sensor 260 captures a subject image formed on the image-capturing surface and outputs an image-capturing signal. The image sensor 260 is connected with the body-side control unit 230 and the signal processing unit 270.

The image sensor 260 includes pixels used for image generation (hereafter will be referred to as image-capturing pixels) and pixels used for focus detection (hereafter will be referred to as focus detection pixels). Signals generated at the image-capturing pixels (hereafter will be referred to as image-capturing pixel signals) are used by the signal processing unit 270, which will be described later, for image data generation. In addition, signals generated at the focus detection pixels (hereafter will be referred to as focus detection pixel signals) are used by the signal processing unit 270, which will be described later, for focus detection processing through which an image forming state achieved via the interchangeable lens 3, i.e., the focus position, is detected.

The signal processing unit 270 generates image data by executing a predetermined image processing on the image-capturing pixel signals output from the image sensor 260. The image data thus generated may be recorded into a storage medium (not shown) in a predetermined file format or may be used to display an image at the display unit 290. The signal processing unit 270 is connected with the body-side control unit 230, the image sensor 260 and the display unit 290.

In addition, the signal processing unit 270 detects the focus position of the interchangeable lens 3 by using the focus detection pixel signals output from the image sensor 260 and calculates a defocus quantity. The signal processing unit 270 calculates the distance over which the focusing lens needs to move in order to reach the in-focus position based upon the defocus quantity it has calculated.

The operation member 280, which includes a shutter release button, an operation switch and the like, is disposed at an exterior surface of the camera body 2. The user operates the operation member 280 to issue a photographing instruction, a photographing condition setting instruction and the like. The operation member 280 transmits an operation signal corresponding to a user operation to the body-side control unit 230.

The display unit 290 may be constituted with, for instance, a liquid crystal display panel. In response to an instruction issued by the body-side control unit 230, the display unit 290 brings up on display an image based upon image data having undergone the processing in the signal processing unit 270, an operation menu screen and the like. The display unit 290 is connected with the body-side control unit 230 and the signal processing unit 270.

Details of the Terminals

Figure 3:
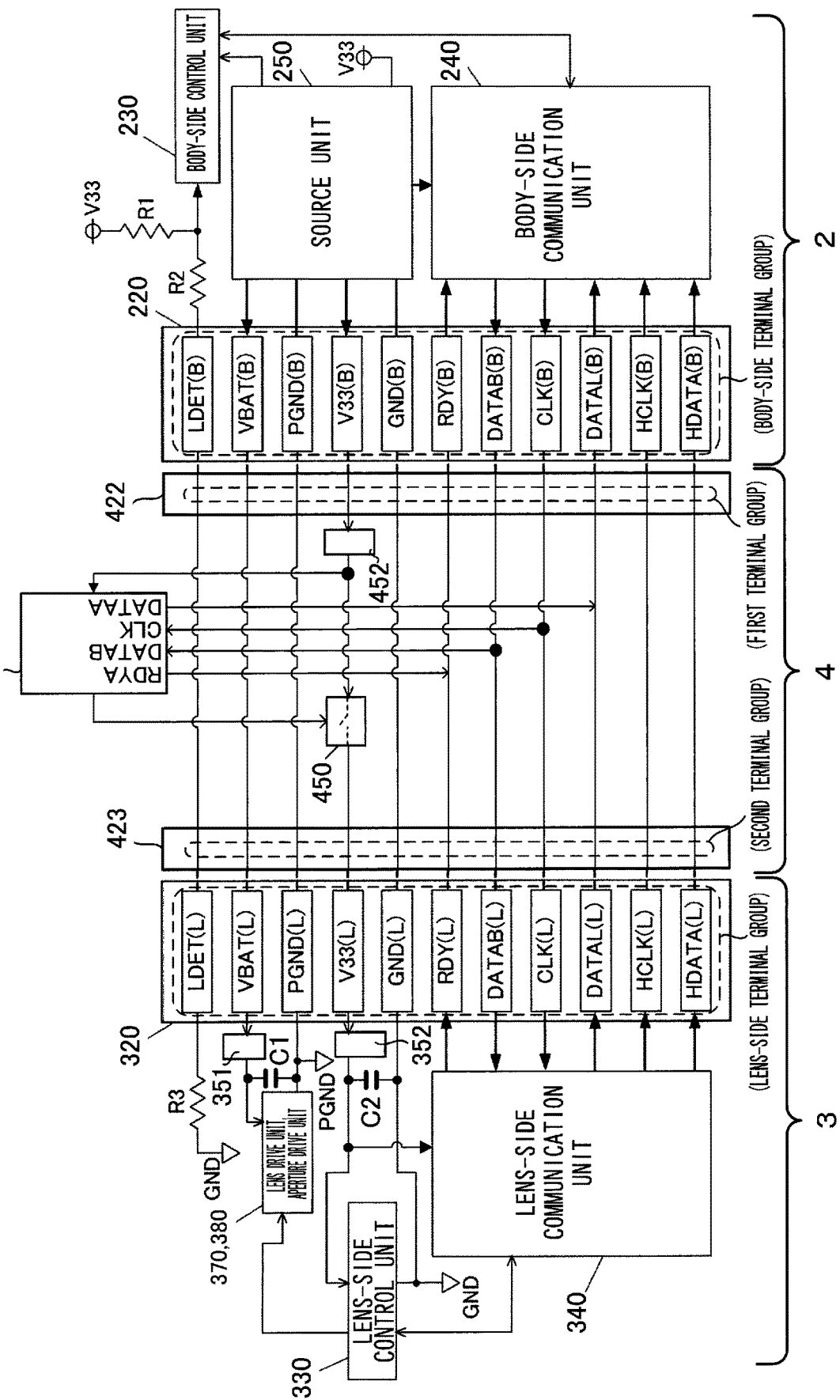
FIG. 3 is a circuit diagram schematically illustrating electrical connections among the camera body, the teleconverter and an interchangeable lens.

FIG. 3 is a circuit diagram schematically illustrating electrical connections among the camera body 2, the teleconverter 4 and the interchangeable lens 3. The arrows in FIG. 3 indicate signal flow.

The body-side terminal holding unit 220 at the body-side mount 210 holds the body-side terminals that include an LDET (B) terminal, a VBAT (B) terminal, a PGND (B) terminal, a V33 (B) terminal, a GND (B) terminal, an RDY (B) terminal, a DATAB (B) terminal, a CLK (B) terminal, a DATAL (B) terminal, an HCLK (B) terminal, and an HDATA (B) terminal. These 11 body-side terminals will be collectively referred to as a body-side terminal group. The individual terminals in the body-side terminal group are disposed in the order indicated in FIG. 3 by forming a circular are centered on the central axis of the body-side mount unit 210.

The lens-side terminal holding unit 320 at the lens-side mount 310 holds an LDET (L) terminal, a VBAT (L) terminal, a PGND (L) terminal, a V33 (L) terminal, a GND (L) terminal, an RDY (L) terminal, a DATAB (L) terminal, a CLK (L) terminal, a DATAL (L) terminal, an HCLK (L) terminal, and an HDATA (L) terminal. These 11 lens-side terminals will be collectively referred to as a lens-side terminal group. The individual terminals in the lens-side terminal group are disposed in the order indicated in FIG. 3 by forming a circular arc centered on the optical axis at the lens-side holding unit 320.

A second terminal group held in the front-side terminal holding unit 423 at the teleconverter 4 is identical to the body-side terminal group and a first terminal group held in the rear-side terminal holding unit 422 at the teleconverter 4 is identical to the lens-side terminal group. FIG. 3 does not include an illustration of the individual terminals held in the rear-side terminal holding unit 422 and the front-side terminal holding unit 423.

In addition, the accessory-side control/communication unit 435 is connected in parallel individually between the RDY (B) terminal at the camera body 2 and the RDY (L) terminal at the interchangeable lens 3, between the DATAB (B) terminal at the camera body 2 and the DATAB (L) terminal at the interchangeable lens 3, between the CLK (B) terminal at the camera body 2 and the CLK (L) terminal at the interchangeable lens 3, and between the DATAL (B) terminal at the camera body 2 and the DATAL (L) terminal at the exchangeable lens 3.

The RDY (B) terminal, the DATAB (B) terminal, the CLK (B) terminal, the DATAL (B) terminal, the HCLK (B) terminal, the IHDATA (B) terminal, the RDY (L) terminal, the DATAB (L) terminal, the CLK (L) terminal, the DATAL (L) terminal, the HCLK (L) terminal and the HDATA (L) terminal are the communication terminals mentioned earlier. Among the communication terminals, the RDY (B) terminal, the DATAB (B) terminal, the CLK (B) terminal and the DATAL (B) terminal are used in command data communication, which will be explained later. In addition, the HCLK (B) terminal and the HDATA (B) terminal among the communication terminals are used in hotline communication, which will be explained later. The embodiment includes two communication systems, i.e., a command data communication system and a hotline communication system. The command data communication system and the hotline communication system are two different communication systems independent of each other.

The RDY (B) terminal, the DATAB (B) terminal, the CLK (B) terminal, the DATAL (B) terminal, the HCLK (B) terminal and the HDATA (B) terminal are each connected to the body-side control unit 230 via the body-side communication unit 240. The RDY (L) terminal, the DATAB (L) terminal, the CLK (L) terminal, the DATAL (L) terminal, the HCLK (L) terminal and the HDATA (L) terminal are each connected to the lens-side control unit 330 via the lens-side communication unit 340.

The RDY (B) terminal is an input terminal to which a signal from the RDY (L) terminal is input. A signal from the RDY (L) terminal at the interchangeable lens 3, which indicates whether or not the interchangeable lens 3 is in a command data communication-enabled state (hereafter will be notated as an RDYL signal), is input to the RDY (B) terminal via the teleconverter 4. In addition, a signal indicating whether or not the teleconverter 4 is in a command data communication-enabled state (hereafter will be notated as an RDYA signal) is input from the teleconverter 4 to the RDY (B) terminal. In a command data communication-enabled state, the lens-side control unit 330 shifts the potential of the RDYL signal from L level to H level and then back to L level. In a command data communication-enabled state, the accessory-side control/communication unit 435 shifts the potential of the RDYA signal from L level to H level and then back to L level. Upon receiving the RDYL signal or the RDYA signal, an RDYB signal is transmitted from the RDY (B) terminal to the body-side control unit 230 via the body-side communication unit 240. Upon sensing that the potential of the RDYB signal has shifted from L level to H level and then back to L level, the body-side control unit 230 makes a decision as to whether or not the camera accessory specified by a device ID is in a command data communication-enabled state.

The lens-side control unit 330 is capable of switching the output through the RDY (L) terminal at the interchangeable lens 3 to a high impedance state. In addition, the accessory-side control/communication unit 435 is capable of switching the output through the RDY (L) terminal at the teleconverter 4 to a high impedance state. The term "high impedance state" is used to refer to a state in which the connection with the body-side communication unit 240 is substantially cut off. As the accessory-side control/communication unit 435 cuts off connection with the body-side communication unit 240, the lens-side communication unit 340 becomes connected with the body-side communication unit 240. In addition, as the lens-side communication unit 340 cuts off connection with the body-side communication unit 240, the accessory-side control/communication unit 435 becomes connected with the body-side communication unit 240. When the accessory-side control/communication unit 435 is connected with the body-side communication unit 240, an RDYA signal from the teleconverter 4 is transmitted to the RDY (B) terminal at the camera body 2. When the lens-side communication unit 340 is connected with the body-side communication unit 240, the RDYL signal from the interchangeable lens 3 is transmitted to the RDY(B) terminal at the camera body 2. The RDYA signal output by the accessory-side control/communication unit 435 is a signal generated by the accessory-side control/communication unit 435 through decision-making executed thereat. The RDYL signal output by the lens-side communication unit 340 is a signal generated by the lens-side control unit 330 through decision-making executed thereat.

Through the DATAB (B) terminal, a data signal (hereafter will be notated as a DATAB signal) is output to the DATAB (L) terminal at the interchangeable lens 3 or the teleconverter 4. The DATAB (L) terminal is an input terminal at which the DATAB signal output through the DATAB (B) terminal is input. This means that a DATAB signal from the body-side communication unit 240 is input to the lens-side communication unit 340 or the accessory-side control/communication unit 435.

The DATAL (B) terminal is an input terminal through which a signal from the DATAL (L) terminal is input. A data signal (hereafter will be notated as a DATAA signal) from the DATAL (L) terminal at the teleconverter 4 is input to the DATAL (B) terminal, or a data signal (hereafter will be notated as a DATAL signal) from the DATAL (L) terminal at the interchangeable lens 3 is input to the DATAL (B) terminal via the teleconverter 4.

The lens-side communication unit 340 is capable of switching the output through the DATAL (L) terminal at the interchangeable lens 3 to a high impedance state. In addition, the accessory-side control/communication unit 435 is capable of switching the output through the DATAL (L) terminal at the teleconverter 4 to a high impedance state. When the accessory-side control/communication unit 435 is connected with the body-side communication unit 240, the DATAA signal from the teleconverter 4 is transmitted to the DATAL (B) terminal at the camera body 2. When the lens-side communication unit 340 is connected with the body-side communication unit 240, the DATAL signal from the interchangeable lens 3 is transmitted to the DATAL (B) terminal at the camera body 2. The DATAA signal output by the accessory-side control/communication unit 435 is a signal generated by the accessory-side control/communication unit 435 through decision-making executed thereat. The DATAL signal output by the lens-side communication unit 340 is a signal generated by the lens-side control unit 330 through decision-making executed thereat.

The CLK (B) terminal is an output terminal through which a clock signal (hereafter will be notated as a CLK signal) is output to a CLK (L) terminal. The CLK (L) terminal is an input terminal to which the CLK signal from the CLK (B) terminal is input. A CLK signal provided from the body-side communication unit 240 is input to the lens-side communication unit 340 via the teleconverter 4. A CLK signal from the body-side communication unit 240 is input to the accessory-side control/communication unit 435.

The HCLK (B) terminal is an input terminal through which a clock signal (hereafter will be notated as an HCLK signal) from the HCLK (L) terminal at the interchangeable lens 3 is input to the body-side communication unit 240. The HCLK (L) terminal is an output terminal through which the HCLK signal is output to the HCLK (B) terminal.

The HDATA (B) terminal is an input terminal through which a data signal (hereafter will be notated as an HDATA signal) from the HDATA (L) terminal at the interchangeable lens 3 is input to the body-side communication unit 240. The HDATA (L) terminal is an output terminal through which the HDATA signal is output to the HDATA (B) terminal.

The LDET (B) terminal is the mount detection terminal explained earlier. At the camera body 2, the LDET (B) terminal is connected to the body-side control unit 230 via a resistor R2. Between the resistor R2 and the body-side control unit 230, a source V33 provided from the source unit 250 is connected via a resistor R1.

At the interchangeable lens 3, the LDET (L) terminal is connected (grounded) to a GND potential via a resistor R3. In addition, at the teleconverter 4, the area located between the LDET (B) terminal and the LDET (L) terminal is not grounded. The embodiment will be described by assuming that the LDET (L) terminal is grounded at the master lens and that the area between the LDET (B) terminal and the LDET (L) terminal at the non-master lens is not grounded.

In such a structure, the LDET (B) terminal is pulled up within the camera body 2 and thus, takes the potential of the source V33 when the interchangeable lens 3 is not mounted. Once the interchangeable lens 3 is mounted, the LDET (L) terminal assuming the ground potential becomes connected to the pulled up LDET (B) terminal, thereby lowering the potential at the LDET (B) terminal. As a result, the camera body 2 is able to detect that the interchangeable lens 3 has been mounted. In addition, when only the teleconverter 4 is mounted but the interchangeable lens 3 is not mounted at the camera body 2, the potential of the source V33 is sustained at the LDET (B) terminal.

The VBAT (B) terminal is a power supply terminal through which electric power is supplied to a camera accessory. The lens drive unit 370 and the aperture drive unit 380 are driven with electric power provided from the VBAT (B) terminal to the VBAT (L) terminal. The lens drive unit 370 and the aperture drive unit 380, each having an actuator such as a motor, require a voltage higher than or a current greater than that of the electric power provided to the lens-side control unit 330. In the following description, a voltage applied from the source unit 250 to the VBAT (B) terminal will be referred to as a drive system voltage. The PGND (B) terminal is a ground terminal corresponding to the VBAT (B) terminal. The PGND (B) terminal is connected with the PGND (L) terminal.

The V33 (B) terminal is also a power supply terminal through which electric power is provided to a camera accessory. The electric power provided from the V33 (B) terminal to the teleconverter 4 is distributed to the various components of the teleconverter 4, such as the accessory-side control/communication unit 435, via the source circuit 452. In addition, electric power output from the source circuit 452 is provided to the V33 (L) terminal at the interchangeable lens 3 via the switch 450. The electric power provided to the interchangeable lens 3 through the V33 (L) terminal is distributed to the various components of the interchangeable lens 3, such as the lens-side control unit 330, via the source circuit 352.

The lens-side control unit 330, connected to the V33 (B) terminal, operates at a voltage lower than or an electric current smaller than the drive system voltage. In the following description, the voltage applied from the source unit 250 to the V33 (B) terminal will be referred to as a circuit system voltage. The GND (B) terminal is a ground terminal corresponding to the V33 (B) terminal. The GND (B) terminal is connected with the GND (L) terminal at the interchangeable lens 3 via a signal line disposed within the teleconverter 4 as has been explained earlier.

It is to be noted that the direction of electric power supply is indicated with arrows in FIG. 3. The electric power derived from the circuit system voltage (hereafter will be referred to as circuit system power) is also distributed, via the source unit 250, to the various components disposed in the camera body 2, such as the body-side control unit 230.

The source circuit 452 and the switch 450 of the teleconverter 4 are inserted and connected in series between the V33 (B) terminal at the camera body 2 and V33 (L) terminal at the interchangeable lens 3. When the switch 450 is in an ON state, the circuit system power is provided to the V33 (L) terminal via the source circuit 452, whereas when the switch 450 is in an OFF state, circuit system power supply to the V33 (L) terminal is cut off. Since the circuit system power is provided to the accessory-side control/communication unit 435 at a point further on the upstream side relative to the switch 450, the circuit system power supply is sustained regardless of the ON/OFF state of the switch 450.

The switch 450 is controlled to sustain an open state until the device ID assignment command data communication (to be explained later) between the accessory-side control/communication unit 435 and the body-side communication unit 240 is completed after the accessory-side control/communication unit 435 is started up. Once the device ID assignment command data communication between the accessory-side control/communication unit 435 and the body-side communication unit 240 is completed, the switch 450 is controlled to take a closed state. As the switch 450 enters a closed state, the camera body 2 and a next camera accessory (the interchangeable lens 3 in this embodiment) become connected with each other, thereby starting circuit system power supply to the camera accessory.

At the interchangeable lens 3, the VBAT (L) terminal is connected with a source circuit 351. The output of the source circuit 351 and the PGND (L) terminal are connected to the lens drive unit 370 and the aperture drive unit 380. In addition, the V33 (L) terminal is connected with the source circuit 352 as has been explained earlier. The output of the source terminal 352 and the GND (L) terminal are connected to the various components such as the lens-side control unit 330.

Description of Command Data Communication

Figure 4:
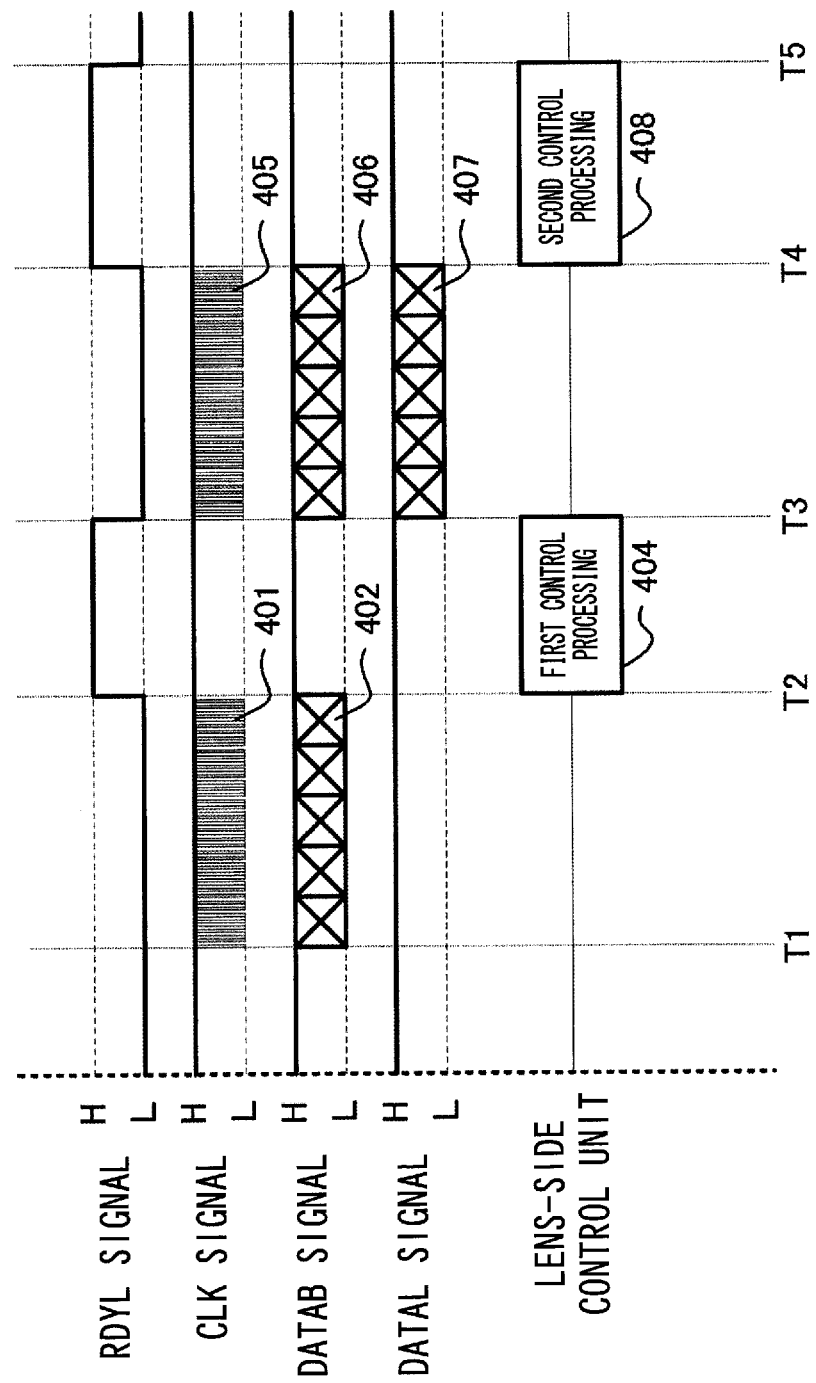
FIG. 4 is a chart presenting an example of timing with which command data communication may be carried out between the body-side communication unit and the lens-side communication unit.

Next, in reference to FIG. 4, command data communication will be explained. Through command data communication, data signals can be transmitted/received bidirectionally between the lens-side control unit 330 and the body-side control unit 230.

In the following description, a mode of utilization in which the interchangeable lens 3 is indirectly mounted at the camera body 2 via the teleconverter 4 will be referred to as a first utilization example and a mode of utilization in which the interchangeable lens 3 is directly mounted at the camera body 2 without the teleconverter 4 mounted between them will be referred to as a second utilization example. FIG. 4 is a chart indicating timing with which various signals may be provided in the second utilization example.

In the embodiment, two different types of command data communication, i.e., device ID assignment command data communication and regular command data communication, are carried out. The device ID assignment command data communication is command data communication through which the camera body 2 assigns a device ID to a camera accessory such as the interchangeable lens 3 or the teleconverter 4 mounted at the camera body 2. The regular command data communication is command data communication executed after a device ID is assigned through the device ID assignment command data communication (see FIG. 7).

Through a single session of command data communication, a single command packet 402 is transmitted from the camera body 2 to the camera accessory and then the camera body 2 and the camera accessory each transmit and receive a single data packet by exchanging data packets 406 and 407.

The command packet 402 includes data expressing a request for model name information, data expressing a request for a discriminating signal used to determine whether the device is a master lens or a non-master lens, data indicating the device ID of the partner with which the particular command data communication is to be carried out, data expressing a request for information pertaining to the optical characteristics of the camera accessory, data indicating specific data to be transmitted in a subsequent data packet, data indicating the data length of the subsequent data packet and the like.

The data packet 406 transmitted from the camera body 2 to the camera accessory contains data indicating the extent to which a movable portion in the camera accessory is to be driven, data used to indicate the operating state within the camera body 2, data indicating the device ID and the like.

The data packet 407 transmitted from the camera accessory to the camera body 2 contains data constituting the model name information for the camera accessory, data expressing a discriminating signal used to determine whether the camera accessory is a master lens or a non-master lens, data used to indicate the operating state of the movable portion in the camera accessory, data constituting information pertaining to the optical characteristics of the camera accessory, data indicating the magnification factor of the teleconverter 4, data indicating the optical characteristics of a specific interchangeable lens having been mounted at the teleconverter 4 and the like.

While explanation is given below by referring to the example presented in FIG. 4 in which command data communication is carried out between the body-side communication unit 240 and the lens-side communication unit 340, command data communication is likewise carried out between the body-side communication unit 240 and the accessory-side control/communication unit 435. For command data communication carried out between the body-side communication unit 240 and the accessory-side control/communication unit 435, the RDYL signal, the DATAL signal, and the lens-side communication unit 340 in the chart presented in FIG. 4 and in the description will be respectively replaced with the RDYA signal, the DATAA signal and the accessory-side control/communication unit 435.

The lens-side communication unit 340 sets the potential of the RDYL signal to L level at the start of command data communication. In addition, upon deciding that a command data communication enabled condition is established, the lens-side communication unit 340 sustains the potential of the RDYL signal at L level. Under conditions in which command data communication cannot be carried out, the lens-side communication unit 340 sets the level of the RDYL signal to H level.

If the RDYL signal is at L level at a command data communication start (T1), the body-side communication unit 240 starts outputting a clock signal 401 to be used as a CLK signal. As a result, the clock signal 401 is transmitted from the camera body 2 to the interchangeable lens 3. The frequency of the clock signal 401 may be, for instance, 8 MHz.

The body-side communication unit 240 also outputs a command packet 402 to be used as a DATAB signal in synchronization with the clock signal 401. In FIG. 4, the command packet 402 is represented by the H level-L level switchover. Once transmission of the command packet 402 is completed, the body-side communication unit 240 ends the output of the clock signal 401.

The lens-side control unit 330 makes a decision as to whether or not a communication error has occurred with respect to the command packet 402 by using an error detection signifier (e.g., checksum data) included in the command packet 402 having been received by the lens-side communication unit 340. Upon deciding that no communication error has occurred, the lens-side communication unit 340 sets the RDYL signal to H level (T2). The lens-side control unit 330 then starts first control processing 404 based upon the command packet 402.

Once the first control processing 404 executed by the lens-side control unit 330 is completed, the lens-side communication unit 340 is able to set the RDYL signal to L level (T3). As the level of the RDYL signal input to the body-side communication unit 240 shifts to L level, the body-side communication unit 240 outputs a clock signal 405 to be used as a CLK signal.

The body-side communication unit 240 also outputs a data packet 406 to be used as a DATAB signal in synchronization with the clock signal 405. In FIG. 4, the data packet 406 is represented by the H level-L level switchover. Once transmission of the data packet 406 of a predetermined data length is completed, the body-side communication unit 240 ends the output of the clock signal 405 (T4).

In response to the clock signal 405 input thereto, the lens-side communication unit 340 outputs a data packet 407 as a DATAL signal in synchronization with the clock signal 405. In FIG. 4, the data packet 407 is represented by the H level-L level switchover.

The lens-side control unit 330 makes a decision as to whether or not a communication error has occurred with respect to the data packet 406 by using an error detection signifier (e.g., checksum data) included in the data packet 406 having been received by the lens-side communication unit 340. Upon deciding that no communication error has occurred, the lens-side communication unit 340 sets the RDYL signal to H level again (T4). The lens-side control unit 330 then starts second control processing 408 based upon the data packet 406.

Packet Structure

Figure 6:
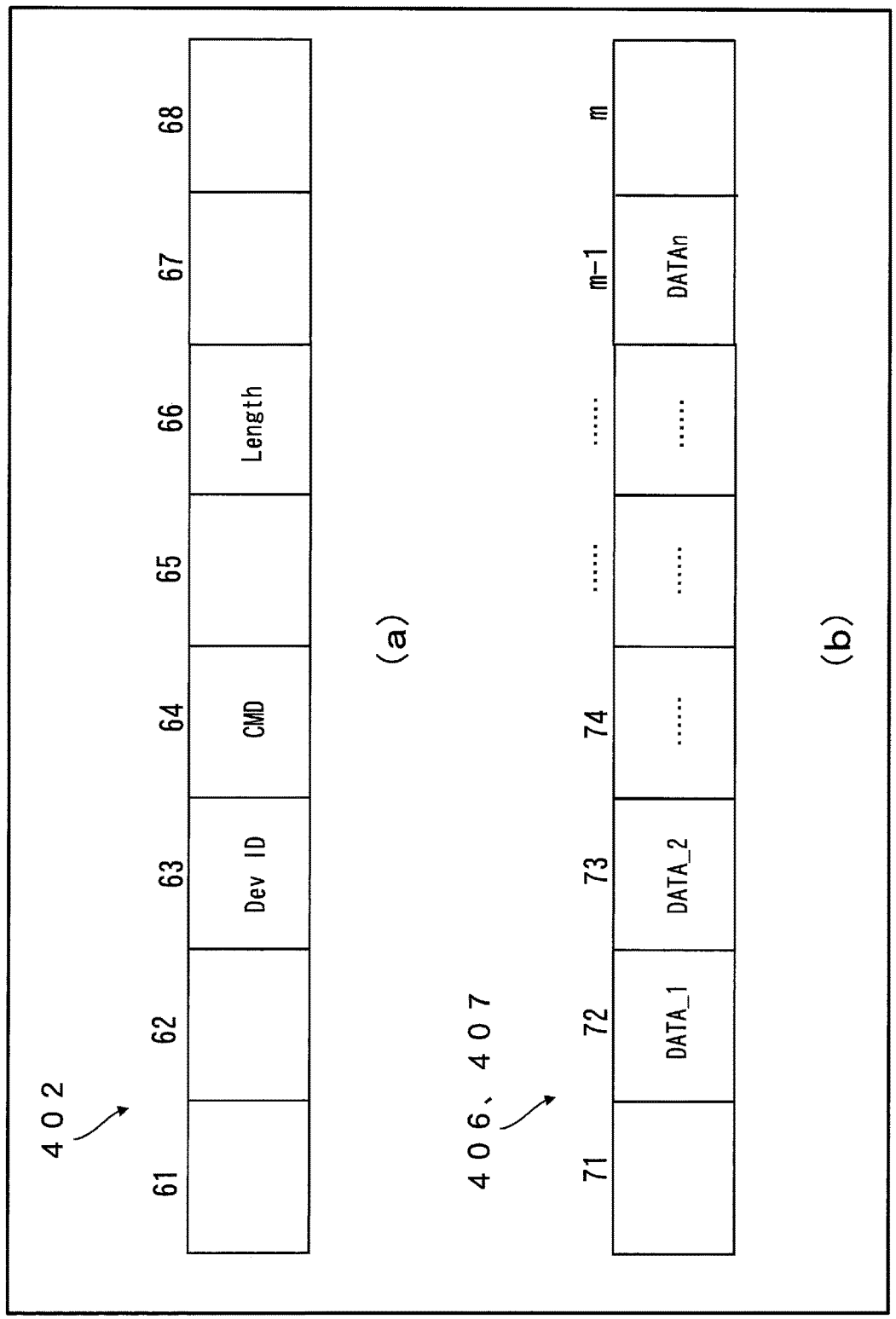
FIG. 6 shows a diagram of structure that may be adopted for command packets presented in (a), and a diagram of a structure that may be adopted for data packets, presented in (b).

In FIG. 6, (a) is a diagram presenting an example of a structure that may be adopted for the command packet 402, whereas (b) is a diagram presenting an example of a structure that may be adopted for the data packets 406 and 407. The command packet 402 and the data packets 406 and 407 each contain synchronization data as the header portion.

The command packet 402 is fixed-length data assuming, for instance, an eight-byte length overall. "Dev ID" 63 is fixed-length data that include the device ID of the communication partner. Since regular command data communication is executed following device ID assignment command data communication, a command packet 402 including the device ID of the communication partner is transmitted through the regular command data communication. Accordingly, data indicating the device ID of the communication partner are set as the "Dev ID" 63. In device ID assignment command data communication, which is executed before a device ID is assigned, on the other hand, a command packet 402 is transmitted without specifying a communication partner device ID. A predetermined initial value is set as the "Dev ID" 63 in the command packet 402 transmitted in the device ID assignment command data communication, and the command packet 402 sustains the fixed length.

"CMD" 64 is fixed-length data expressing an instruction, a request or the like. The "CMD" 64 includes data expressing an instruction or a request issued from the camera body 2. "Length" 66 is fixed-length data indicating the data length (i.e., the information volume) of a data packet 406 to be transmitted next. Since the data length of the subsequent data packet 406 is indicated in the command packet 402, the receiving-side device (the interchangeable lens 3 or the teleconverter 4) receiving the data packet 406 is able to end the reception of the data packet 406 by measuring the data length in reference to that indicated in the "Length" 66 after detecting the synchronization data.

The data packets 406 and 407 are each variable-length data including sets of data of m bytes indicated in the "Length" 66. "DATA1" 72, "DATA2" 73 . . . , "DATAn" m−1 are separate sets of data each assuming a 1-byte length. The information to be transmitted is divided into units of data, i.e., "DATA1" 72, the "DATA2" 73 . . . , each assuming a single byte length. In a data packet 406 to be transmitted through device ID assignment command data communication, data indicating a device ID are set in, for instance, the "DATA1" 72. In a data packet 407 to be transmitted through regular command data communication, data constituting information originating from the camera accessory are set in the "DATA1" 72, the "DATA2" 73 . . . , the "DATAn" m−1.

Description of the First Control Processing and the Second Control Processing Next, examples of the first control processing 404 and the second control processing 408 executed during the command data communication shown in FIG. 4 will be explained.

Assuming that the command packet 402 includes, for instance, a drive instruction for a lens 361. The lens-side control unit 330 executes the first control processing 404 to generate a data packet 407 indicating that a drive instruction for a lens 361 has been received. Next, the lens-side control unit 330 executes the second control processing 408 so as to issue an instruction for the lens drive unit 370 to move the lens 361 by the extent indicated in the data packet 406. As a result, the lens 361 moves along the optical axis O. In response to the drive instruction issued by the lens-side control unit 330 to the lens drive unit 370 so as to move the lens 361, the lens-side communication unit 340 sets the RDYL signal to L level to indicate that the second control processing 408 is completed (T5).

Alternatively, assuming that the command packet 402 includes, for instance, a hotline communication start instruction. In such a case, the lens-side control unit 330 executes the first control processing 404 so as to generate a data packet 407 indicating that a hotline communication start instruction has been received. The lens-side control unit 330 then executes the second control processing 408 so as to output an instruction for starting a hotline communication to the lens-side communication unit 340 and then sets the RDYL signal to L level to indicate that the second control processing 408 is completed (T5).

Figure 7:
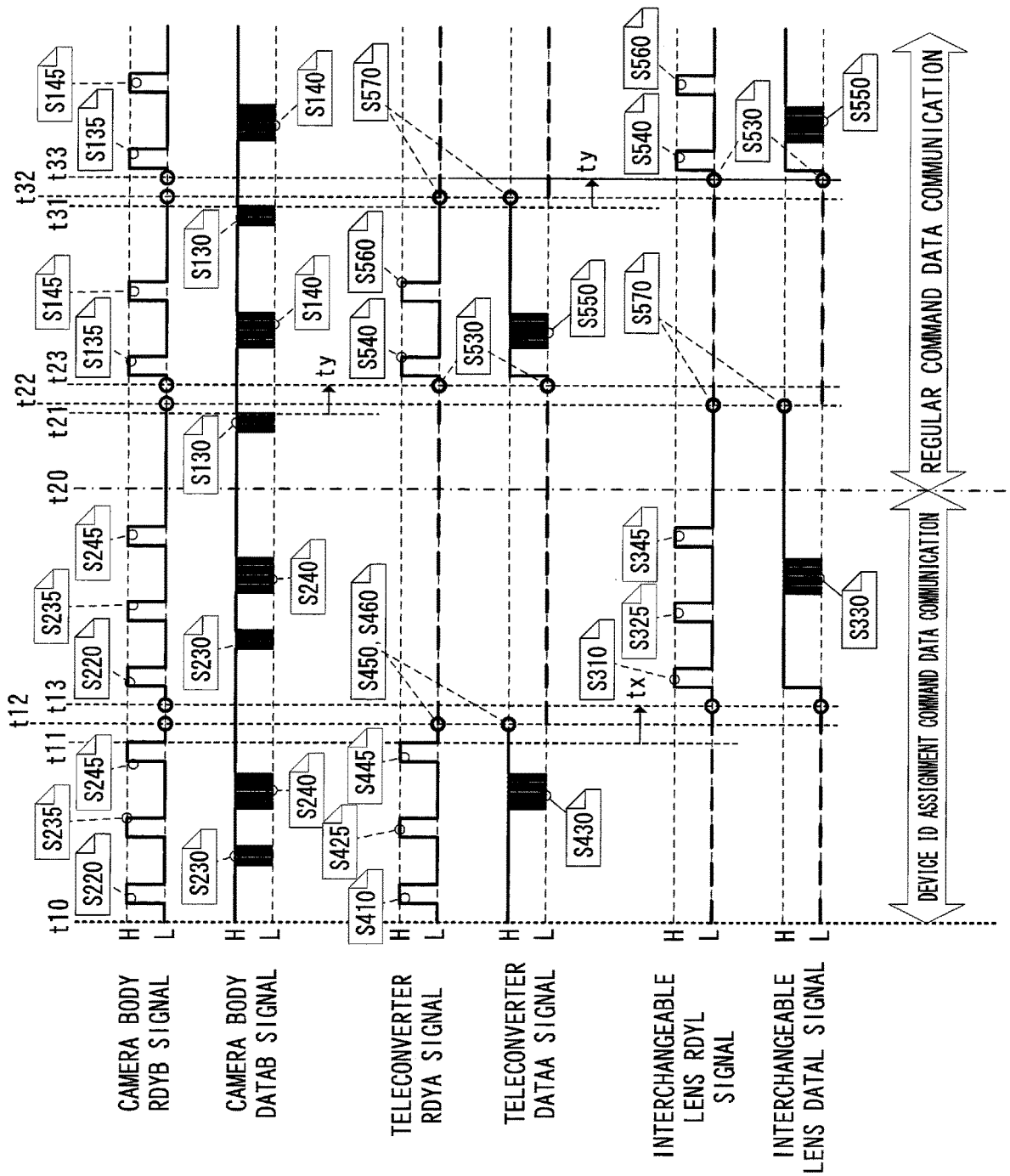
FIG. 7 is a chart illustrating the flow of processing executed for device ID assignment command data communication and regular command data communication.
Figure 8:
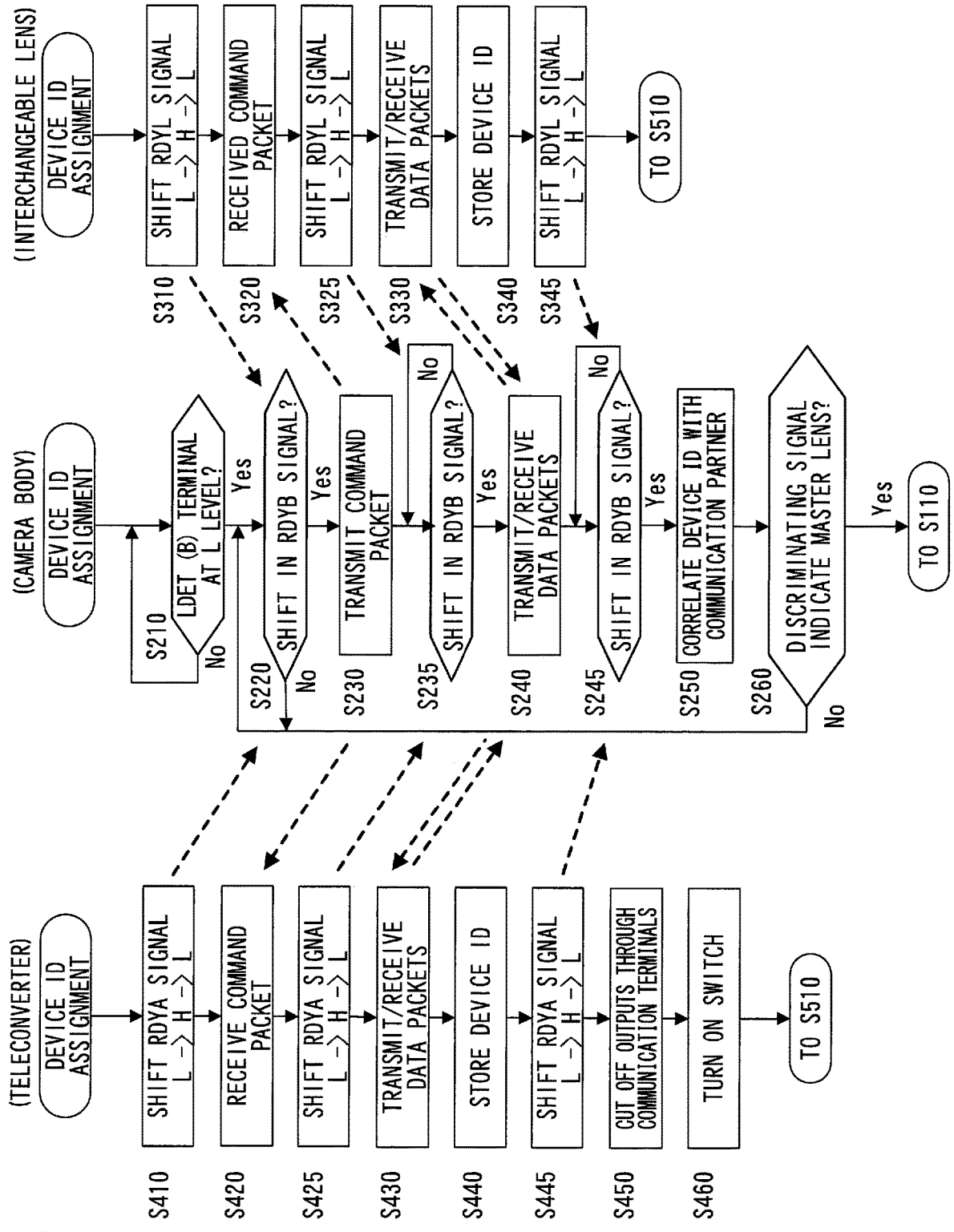
FIG. 8 is a flowchart of processing executed in the body-side control unit, the control/communication unit and the lens-side control unit for device ID assignment command data communication.
Figure 9:
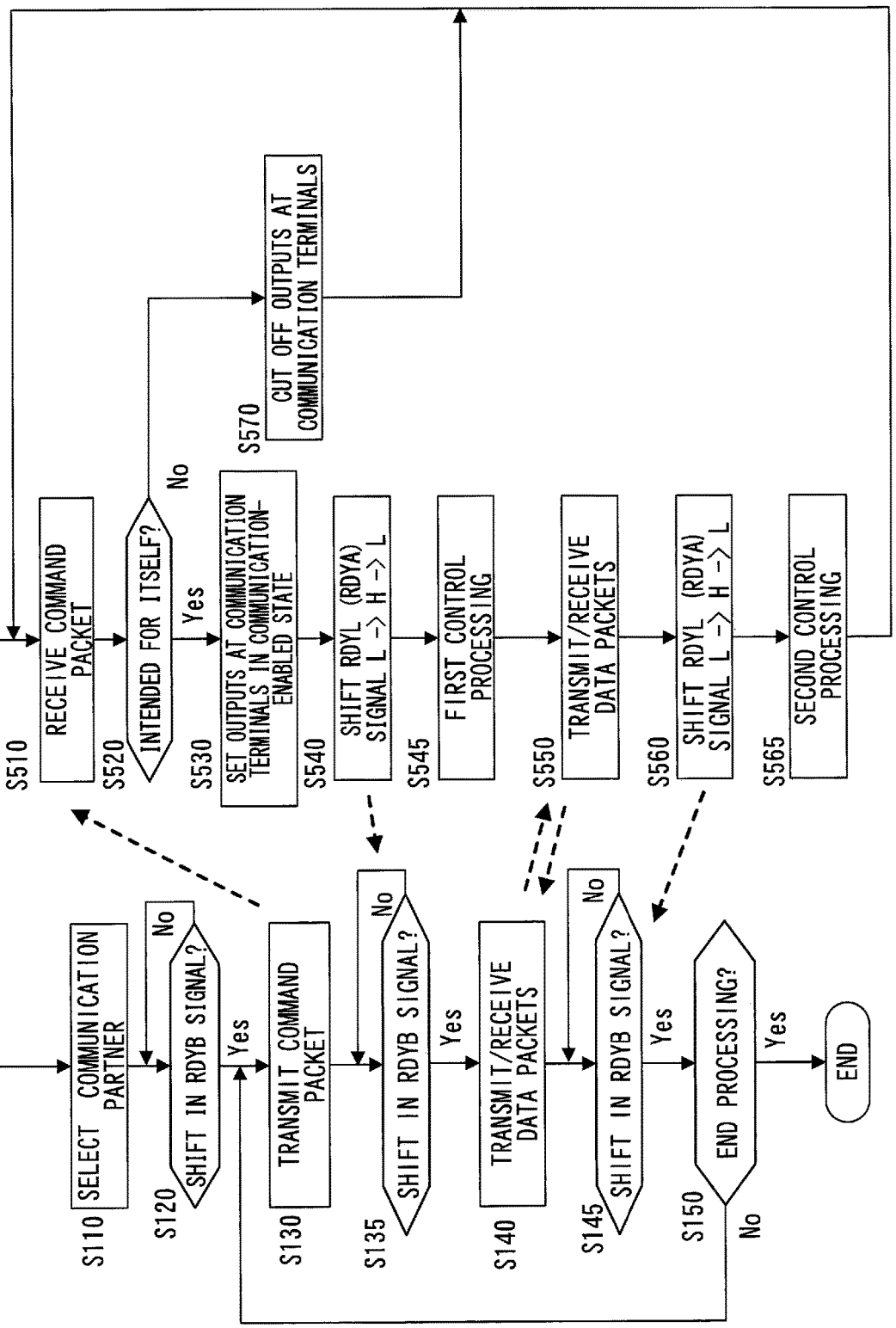
FIG. 9 is a flowchart of regular command data communication processing executed in the body-side control unit, the control/communication unit and the lens-side control unit for regular command data communication.

Flow of Command Data Communication Processing Next, the flow of processing executed for command data communication when the teleconverter 4 is mounted as an accessory will be explained. FIG. 7 is a time chart illustrating the flow of processing for device ID assignment command data communication and for regular command data communication executed after a device ID is assigned. FIG. 7 shows, in order from top to bottom, an RDYB signal input to the camera body 2, a DATAB signal output from the camera body 2, an RDYA signal output from the accessory-side control/communication unit 435, a DATAA signal output from the accessory-side control/communication unit 435, an RDYL signal output from the lens-side control unit 330 and a DATAL signal output from the lens-side control unit 330. In addition, time points are indicated along the horizontal axis in FIG. 7. Reference signs having the prefix S in FIG. 7 are step numbers corresponding to the steps in the processing to be explained in reference to the flowcharts presented in FIG. 8 and FIG. 9. FIG. 8 presents a flowchart of the processing executed for device ID assignment command data communication. FIG. 9 presents a flowchart of the processing executed for regular command data communication.

In an overview of the flow shown in FIG. 7, during a period of time elapsing from a time point t10 through a time point t20, the camera body 2 is engaged in device ID assignment command data communication sequentially with the teleconverter 4 and with the interchangeable lens 3. Then, during a time period including and extending beyond the time point t20, the camera body 2 is engaged in regular command data communication individually with the interchangeable lens 3 or the teleconverter 4.

The body-side communication unit 240 carries out device ID assignment command data communication with the accessory-side control/communication unit 435 from the time point t10 through a time point t12 and carries out device ID assignment command data communication with the lens-side communication unit 340 from a time point t13 through the time point t20.

Upon detecting that a camera accessory has been mounted, the body-side control unit 230 engages in device ID assignment command data communication with each mounted camera accessory so as to individually assign device IDs to mounted camera accessories. In subsequent regular command data communication, the body-side control unit 230 specifies the device ID of the communication partner for each session of command data communication. It is to be noted that the body-side control unit 230 in the embodiment assigns a device ID each time a camera accessory mounted state is detected at the mount detection terminal or each time power is turned on. This means that even if a past device ID is held in the storage unit of the body-side control unit 230 prior to the device ID assignment command data communication, the communication will be carried out by reassigning a new device ID.

Device ID Assignment Command Data Communication

As the interchangeable lens 3 is mounted at the camera body 2 indirectly via the teleconverter 4, the potential at the LDET (B) terminal becomes lower. The body-side control unit 230, detecting that the potential at the LDET (B) terminal has become lower, provides circuit system power to the V33 (B) terminal at the teleconverter 4. As a result, power is supplied to the accessory-side control/communication unit 435, thereby starting up the accessory-side control/communication unit 435 at the time point t10. The accessory-side control/communication unit 435, having been started up, shifts the RDYA signal from L level to H level and then back to L level (S410) so as to notify the camera body 2 that it has entered a reception-enabled state with respect to device ID assignment command data communication.

The body-side control unit 230, having been notified by way of the RDYB signal that the teleconverter 4 is in a reception-enabled state, outputs the DATAB signal in synchronization with the clock signal 401 (S230). This DATAB signal contains a command packet 402, which includes an assignment instruction with respect to device ID assignment to the teleconverter 4 and a request to the teleconverter 4 for a discriminating signal. The accessory-side control/communication unit 435, having completed the first control processing 404 for the command packet 402, shifts the RDYA signal from L level to H level and then back to L level (S425) so as to notify the camera body 2 that it is in a reception-enabled state. The body-side communication unit 240 outputs the DATAB signal in synchronization with the clock signal 405 (S240). The DATAB signal output at this time is a data packet 406 that includes the device ID (e.g., a device ID 1) assigned to the teleconverter 4. The accessory-side control/communication unit 435 having received the data packet 406 executes the second control processing 408 so as to store the device ID 1 into the storage unit 437 or hold the device ID 1 in the accessory-side control/communication unit 435.

The accessory-side control/communication unit 435 outputs the DATAA signal in synchronization with the clock signal 405 (S430). This DATAA signal contains a data packet 407 that includes the discriminating signal, the model name information and the like corresponding to the teleconverter 4. In the embodiment, the discriminating signal for the teleconverter 4 indicates that it is a non-master lens with, for instance, data "01" included in the area "DATA_1" 72. Namely, the camera body 2, having received the discriminating signal (01) from the teleconverter 4, is able to recognize that another device (the interchangeable lens 3 in this example) can be mounted in a communication-enabled state on the subject side of the camera accessory (teleconverter 4) with which the camera body 2 is currently in communication. The discriminating signal for the teleconverter 4 is stored in the storage unit 437. In addition, the camera body 2 holds the device ID 1 it has assigned to the teleconverter 4 within the body-side control unit 230 by correlating it to the model name information received from the teleconverter 4.

Having confirmed that the reception of the data packet 406 has been completed (S240) and that the transmission of the data packet 407 has been completed (S430), the accessory-side control/communication unit 435 abandons communication by shifting the RDYA signal from L level to H level and then back to L level (S445) and also cuts off the output of the RDYA signal and the DATAA signal at a time point (t12, S450) that occurs during a predetermined period of time following a time point t11 at which the RDYA signal shifts to L level. In addition, the accessory-side control/communication unit 435 turns on the switch 450, i.e., connects the circuit system power provided from the source circuit 452 to the interchangeable lens 3 (S460).

With the circuit system power connected, power supply to the interchangeable lens 3 starts and the lens-side control unit 330 is started up at a time point t13. Once the lens-side control unit 330 is started up, the interchangeable lens 3 is able to engage in device ID assignment command data communication with the camera body 2 and the lens-side control unit 330 executes processing similar to the processing executed by the accessory-side control/communication unit from the time point t10 through the time point t12. In the embodiment, the discriminating signal for the interchangeable lens 3 indicates that it is a master lens with, for instance, data "00" included in the area "DATA_1" 72. Namely, the camera body 2, having received the discriminating signal (00) from the interchangeable lens 3, is able to recognize that another device is not mounted in a communication-enabled state on the subject side of the camera accessory (interchangeable lens 3) with which the camera body 2 is currently in communication. The discriminating signal for the interchangeable lens 3 is stored in the storage unit 350. In addition, the camera body 2 assigns a device ID (e.g., device ID 2) to the interchangeable lens 3 and holds information it has received from the interchangeable lens 3 (e.g., the model name information) and the device ID 2 assigned to the interchangeable lens 3 into the body-side control unit 230 by correlating them with each other. The interchangeable lens 3 also stores the assigned device ID 2 into the storage unit 350 or holds it in the lens-side control unit 330. The body-side control unit 230, having recognized, based upon the discriminating signal, that the device assigned with the device ID 2 is a master lens with no other device mounted in a communication-enabled state on the subject side thereof, ends the device ID assignment command data communication.

By executing device ID assignment command data communication as described above, the camera body 2 is able to assign device IDs to all the camera accessories mounted in a communication-enabled state and furthermore, is able to hold each device ID it has assigned in correspondence to the model name information it has obtained.

In the embodiment, during the time period elapsing from the time point t10 through the time point t12, the teleconverter 4 alone is provided with electric power and is able to engage in device ID assignment command data communication with the camera body 2, so as to receive an instruction for device ID assignment and a request for the discriminating signal. However, the interchangeable lens 3, which is not provided with electric power, cannot carry out device ID assignment command data communication with the camera body 2, and thus does not receive a device ID assignment instruction or a request for the discriminating signal. This means that the accessory-side control/communication unit 435 alone is able to transmit the model name information and the discriminating signal corresponding to the subject device to the camera body 2. In response, the camera body 2 assigns the device ID 1 to the teleconverter 4 and holds the information (e.g., the model name information) having been received from the teleconverter 4 and the device ID 1 assigned to the teleconverter 4 in association with each other at the body-side control unit 230. The body-side control unit 230 is able to ascertain, based upon the discriminating signal, that the device to which the device ID 1 has been assigned is a non-master lens and that another device in a communication-enabled state can be mounted on the subject side thereof, and is thus able to start assignment of the next device ID 2.

Regular Command Data Communication

The body-side control unit 230 having completed the device ID assignment command data communication carries out regular command data communication over a period of time starting at the time point t20. Regular command data communication is carried out individually with either the interchangeable lens 3 or the teleconverter 4 specified by the camera body 2 as a communication partner.

In the example presented in FIG. 7, the camera body 2 engages in regular command data communication with the teleconverter 4 from a time point t23 through a time point t32 and engages in regular command data communication with the interchangeable lens 3 over a period of time starting at t33.

The body-side communication unit 240, detecting that the RDYB signal has shifted from L level to H level and then back to L level, outputs a DATAB signal in synchronization with the clock signal 401 (step S130). The DATAB signal output at this time contains a command packet 402 which includes an instruction or a request for the teleconverter 4. This means that the command packet 402 includes the device ID 1 corresponding to the teleconverter 4.

The command packet 402 is received at both the lens-side communication unit 340 and the accessory-side control/communication unit 435. The lens-side communication unit 340, having received the command packet 402, detects that the device ID 1, different from its own device ID 2 is included in the command packet 402 and cuts off the output of the RDYL signal and the DATAL signal over a predetermined length of time (through t33) starting at a time point t21 at which the reception of the command packet 402 is completed (S570). The lens-side communication unit 340 is able to ascertain the predetermined length of time over which the signal outputs are to be cut off, since the command packet 402 includes the data length of the subsequent data packet 406.

The accessory-side control/communication unit 435, having received the command packet 402, senses that its own device ID 1 is included in the command packet 402 and sets the RDYA signal output and the DATAA signal output in a communication-enabled state within a predetermined length of time starting from the time point t21, at which the reception of the command packet 402 is completed (t23, S530). The accessory-side control/communication unit 435 shifts the RDYA signal from L level to H level and then back to L level (S540), so as to notify the camera body 2 that it is in a command data communication-enabled state and can therefore, receive the subsequent data packet 406.

The body-side communication unit 240, having been notified by the teleconverter 4 that it is in a reception-enabled state, outputs a DATAB signal in synchronization with the clock signal 405 (S140). The DATAB signal output at this time contains a data packet 406 which includes data and the like needed by the teleconverter 4 in order to execute an operation specified in the command packet 402, the reception of which has been completed at the time point t21. The accessory-side control/communication unit 435 outputs a DATAA signal in synchronization with the clock signal 405 (S550). The DATAA signal output at this time contains a data packet 407, which may include, for instance, information indicating the magnification factor with respect to the focal length of the teleconverter 4 and optical characteristics of the lens 460, information indicating the optical characteristics of a specific interchangeable lens having been mounted, and the like.

Subsequently, as the RDYB signal shifts from L level to H level and then back to L level, the body-side communication unit 240 outputs a DATAB signal in synchronization with the clock signal 401 (S130). The DATAB signal output at this time contains a command packet 402 that includes the device ID 2 corresponding to the interchangeable lens 3.

The command packet 402 is received at both the lens-side communication unit 340 and the accessory-side control/communication unit 435. The accessory-side control/communication unit 435, verifying that the device ID 2, different from its own device ID 1 is included in the command packet 402, cuts off the outputs of the RDYA signal and the DATAA signal within a predetermined length of time starting at a time point t31 at which the reception of the command packet 402 is completed (t32, S570). The lens-side communication unit 340 verifies that its own device ID 2 is included in the command packet 402 and sets the RDYL signal output and the DATAL signal output in a communication-enabled state within a predetermined length of time starting from the time point t31, at which the reception of the command packet 402 is completed (t33, S530). The lens-side communication unit 340 shifts the RDYL signal from L level to H level and then back to L level (S540), so as to notify the camera body 2 that it is in a reception-enabled state.

The body-side communication unit 240, having been notified by the interchangeable lens 3 that it is in a reception-enabled state, outputs a DATAB signal in synchronization with the clock signal 405 (S140). The DATAB signal output at this time contains a data packet 406 which includes data and the like needed by the interchangeable lens 3 in order to execute an operation specified in the command packet 402, the reception of which has been completed at the time point t31.

The lens-side communication unit 340 outputs at DATAL signal in synchronization with the clock signal 405 (S550). The DATAL signal output at this time contains a data packet 407, which may include, for instance, information indicating the optical characteristics of the interchangeable lens 3 such as the focal length of the image-capturing optical system 360 thereof, information indicating the operating state of a movable portion and the like.

It is to be noted that in the second utilization example, the teleconverter 4 is not mounted and the interchangeable lens 3 is directly mounted at the camera body 2. Under such circumstances, the processing at the time point t13 and beyond in FIG. 7 is executed for device ID assignment command data communication. In addition, the processing at the time point t33 and beyond in FIG. 7 is executed for regular command data communication. In the second utilization example, only one device ID (e.g., the device ID 1) for the interchangeable lens 3 is assigned and a command packet transmitted from the camera body 2 invariably includes the device ID (device ID 1). Consequently, the interchangeable lens 3 is able to receive all the command data output from the camera body 2.

When a plurality of intermediate accessories, e.g., two intermediate accessories, are present between the interchangeable lens 3 and the camera body 2, device ID assignment command data communication between a first intermediate accessory mounted at a position closer to the camera body 2, and the camera body 2 is started ahead of device ID assignment command data communication with the interchangeable lens 3. Once the device ID assignment command data communication with the first intermediate accessory is completed, device ID assignment command data communication with a second intermediate accessory mounted on the subject side (further away from the camera body 2) of the first intermediate accessory, is started. Namely, device ID assignment command data communication is executed by switching to a new communication partner. Once device ID assignment command data communication with all the intermediate accessories mounted between the camera body 2 and the interchangeable lens 3 is carried out, device ID assignment command data communication between the camera body 2 and the interchangeable lens 3 is started.

In other words, when a plurality of intermediate accessories are present, device ID assignment command data communication is carried out by executing processing similar to that executed from the time point t10 through the time point t12 in FIG. 7, repeatedly before the time point t13.

Processing Executed at the Body-side Control Unit 230 for Device ID Assignment Command Data Communication Next, in reference to FIG. 8, the processing executed at the camera body 2 for device ID assignment command data communication will be explained.

Upon executing power-on processing in response to a power-on operation, the body-side control unit 230 starts device ID assignment command data communication as shown in FIG. 8. In step S210, the body-side control unit 230 makes a decision as to whether or not the signal at the LDET (B) terminal is at L level, i.e., whether or not the interchangeable lens 3 is mounted. If the LDET (B) terminal is at L level, the body-side control unit 230 makes an affirmative decision in step S210 and the operation proceeds to step S220 to make a decision based upon a response from the interchangeable lens 3. If, on the other hand, the LDET (B) terminal is at H level, the body-side control unit 230 makes a negative decision in step S210 and in this case, the operation waits for the interchangeable lens 3 to be mounted while repeatedly executing the processing in step S210.

In step S220, the body-side control unit 230 makes a decision as to whether or not the RDYB signal has shifted from L level to H level and then back to L level. Upon sensing such a shift in the RDYB signal, the body-side control unit 230 determines that the teleconverter 4 is in a reception-enabled state and accordingly, makes an affirmative decision in step S220 before the operation proceeds to step S230. If, on the other hand, the shift described above is not sensed, the body-side control unit 230 makes a negative decision in step S220 and repeatedly executes the processing in step S220.

In step S230, the body-side control unit 230 executes control for a command packet 402 to be transmitted through device ID assignment command data communication. In step S235, the body-side control unit 230 makes a decision as to whether or not a shift has occurred in the RDYB signal. If the body-side communication unit 240 senses a shift from L level to H level and then back to L level, the body-side control unit 230 determines that the teleconverter 4 is in a reception-enabled state and accordingly makes an affirmative decision in step S235 before the operation proceeds to step S240. If, on the other hand, the shift described above is not sensed, the body-side control unit 230 makes a negative decision in step S235 and repeatedly executes the processing in step S235.

In step S240, the body-side control unit 230 executes control for a data packet 406 to be transmitted through device ID assignment command data communication and for a data packet 407 from the camera accessory to be received through device ID assignment command data communication, before the operation proceeds to step S245. The data packet 406 includes data indicating a device ID. The data packet 407, on the other hand, includes the discriminating signal and the model name information pertaining to the camera accessory.

In step S245, the body-side control unit 230 makes a decision as to whether or not a shift has occurred in the RDYB signal. Upon sensing that the RDYB signal has shifted from L level to H level and then back to L level, the body-side control unit 230 determines that the communication partner is in a reception-enabled state and accordingly, makes an affirmative decision in step S245 before the operation proceeds to step S250. If, on the other hand, the shift described above is not sensed, the body-side control unit 230 makes a negative decision in step S245 and repeatedly executes the processing in step S245.

In step S250, the body-side control unit 230 holds the device ID having been transmitted and the communication partner model name information in association with each other before the operation proceeds to step S260. Namely, the body-side control unit 230 stores information that includes the device ID 1, having been set in the data packet 406 in step S240, and the "teleconverter 4", indicating the communication partner, bundled together.

In step S260, the body-side control unit 230 makes a decision as to whether or not the discriminating signal indicates a master lens. In other words, the body-side control unit 230 makes a decision as to whether the discriminating signal indicates 00 or 01. If the discriminating signal indicates a master lens (00), the body-side control unit 230 is able to determine that device IDs have been assigned to all the camera accessories mounted in a communication-enabled state, since another camera accessory in a communication-enabled state is never mounted on the subject side of the master lens in this embodiment. Upon making an affirmative decision in step S260, the body-side control unit 230 ends the device ID assignment command data communication shown in FIG. 8. Once the device ID assignment command data communication ends, the operation proceeds to execute regular command data communication, as shown in FIG. 9.

If the discriminating signal indicates a non-master lens (01), another camera accessory in a communication-enabled state may be mounted on the subject side of the non-master lens, and thus, the body-side control unit 230 cannot determine that device IDs have been assigned to all the camera accessories mounted in a communication-enabled state. The body-side control unit 230 thus makes a negative decision in step S260 and the operation returns to step S220. Once the operation returns to step S220, the body-side control unit 230 repeatedly executes processing similar to that explained earlier.

Processing Executed by the Accessory-side Control/Communication Unit 435 for Device ID Assignment Command Data Communication Next, in reference to FIG. 8, the processing executed by the teleconverter 4 for device ID assignment command data communication will be explained.

The accessory-side control/communication unit 435, having started up with circuit system power supplied thereto and having entered a reception-enabled state, shifts the RDYA signal from L level to H level and then back to L level in step S410, and then the operation proceeds to step S420.

In step S420, the accessory-side control/communication unit 435 receives the command packet 402 from the body-side communication unit 240 through the device ID assignment command data communication, before the operation proceeds to step S425. In step S425, the accessory-side control/communication unit 435 shifts the RDYA signal from L level to H level and then back to L level as it enters a reception-enabled state for receiving the next data packet 406, before the operation proceeds to step S430.

In step S430, the accessory-side control/communication unit 435 receives the data packet 406 from the body-side communication unit 240 through the device ID assignment command data communication and also transmits a data packet 407 to the body-side communication unit 240, before the operation proceeds to step S440.

In step S440, the accessory-side control/communication unit 435 stores the device ID, assigned to the teleconverter 4 by the camera body 2 in the data packet 406 received in step S430, into the storage unit 437, and then the operation proceeds to step S445.

In step S445, the accessory-side control/communication unit 435 executes the first control processing 404 to complete storage of the device ID, and once it enters a reception-enabled state, it shifts the RDYA signal from L level to H level and then back to L level before the operation proceeds to step S450.

In step S450, the accessory-side control/communication unit 435 cuts off the outputs of the RDYA signal and the DATAA signal (sets them in a high impedance state) before the operation proceeds to step S460. In step S460, the accessory-side control/communication unit 435 turns on the switch 450, i.e., provides circuit system power to the interchangeable lens 3, thereby ending the device ID assignment command data communication executed as shown in FIG. 8. Following the device ID assignment command data communication, the operation proceeds to execute the regular command data communication shown in FIG. 9.

Processing Executed by the Lens-side Control Unit 330 for Device ID Assignment Command Data Communication Next, in reference to FIG. 8, the processing executed at the interchangeable lens 3 for device ID assignment command data communication will be explained.

The lens-side control unit 330, having been started up with circuit system power supplied thereto and having entered a reception-enabled state, controls the lens-side communication unit 340 to shift the RDYL signal from L level to H level and then back to L level in step S310, and then the operation proceeds to step S320.

In step S320, the lens-side control unit 330 receives, via the lens-side communication unit 340, the command packet 402 transmitted from the body-side communication unit 240 through the device ID assignment command data communication, before the operation proceeds to step S325. In step S325, the lens-side control unit 330 engages the lens-side communication unit 340 to shift the RDYL signal from L level to H level and then back to L level as it enters a reception-enabled state for receiving the subsequent data packet 406, and then the operation proceeds to step S330.

In step S330, the lens-side control unit 330 receives, via the lens-side communication unit 340, the data packet 406 transmitted from the body-side communication unit 240 through the device ID assignment command data communication and also transmits a data packet 407 to the body-side communication unit 240, before the operation proceeds to step S340.

In step S340, the lens-side control unit 330 executes the first control processing 404, to store the device ID assigned to the interchangeable lens 3 by the camera body 2 in the data packet 406 received in step S330, into the lens-side storage unit 350, and then the operation proceeds to step S345.

In step S345, the lens-side control unit 330 completes storage of the device ID and then, as it enters a reception-enabled state, it engages the lens-side communication unit 340 to shift the RDYL signal from L level to H level and then back to L level to end the device ID assignment command data communication in FIG. 8. Following the device ID assignment command data communication, the operation proceeds to execute the regular command data communication shown in FIG. 9.

Processing Executed at the Body-side Control Unit 230 for Regular Command Data Communication Next, the processing executed at the camera body 2 for regular command data communication will be explained in reference to FIG. 9.

In step S110, the body-side control unit 230 selects a communication partner (i.e., a device ID) and then the operation proceeds to step S120. In this situation, communication partner device IDs are held in the body-side control unit 230. When the body-side control unit 230 is to issue an instruction or a request to the teleconverter 4 for, for instance, drive control, or an error check within the teleconverter 4, it will need to specify the teleconverter 4 as the communication partner and accordingly will select the device ID 1. If, on the other hand, it is to issue an instruction or a request to the interchangeable lens 3 for, for instance, initialization through which a lens 361 is moved to its initial position via the lens drive unit 370, drive control for the lens 361 via the lens drive unit 370 or an error check within the interchangeable lens, it will need to specify the interchangeable lens 3 as the communication partner and thus will select the device ID 2.

In step S120, the body-side control unit 230 makes a decision as to whether or not the RDYB signal is at H level. Namely, the body-side control unit 230, sensing that the RDYB signal has shifted from L level to H level and then back to L level following the end of device ID assignment processing or second control processing executed at the camera accessory, makes an affirmative decision in step S120 and the operation proceeds to step S130. If the shift described above is not detected in the signal, the body-side control unit 230 makes a negative decision in step S120 and repeatedly executes the processing in step S120.

The body-side control unit 230 executes control so as to transmit a command packet 402 for regular command data communication, before the operation proceeds to step S135. The command packet 402 transmitted at this time includes data specifying the device ID. In step S135, the body-side control unit 230 makes a decision as to whether or not a shift has occurred in the RDYB signal. The body-side control unit 230, sensing that the RDYB signal has shifted from L level to H level and then back to L level, determines that the communication partner is in a reception-enabled state and accordingly makes an affirmative decision in step S135 before the operation proceeds to step S140. If, on the other hand, the shift described above is not detected, the body-side control unit 230 makes a negative decision in step S135 and repeatedly executes the processing in step S135.

In step S140, the body-side control unit 230 executes control so as to transmit a data packet 406 for regular command data communication and also to receive a data packet 407 from the communication partner camera accessory in regular command data communication, before the operation proceeds to step S145.

In step S145, the body-side control unit 230 makes a decision as to whether or not a shift has occurred in the RDYB signal. The body-side control unit 230, sensing that the RDYB signal has shifted from L level to H level and then back to L level, determines that the communication partner is in a reception-enabled state and accordingly makes an affirmative decision in step S145 before the operation proceeds to step S150. If, on the other hand, the shift described above is not sensed, the body-side control unit 230 makes a negative decision in step S145 and repeatedly executes the processing in step S145.

In step S150, the body-side control unit 230 makes a decision as to whether or not to execute end processing. If, for instance, a power-off operation has been executed, the body-side control unit 230 makes an affirmative decision in step S150 and ends the regular command data communication in FIG. 9 by executing predetermined OFF processing. The device IDs stored in the storage unit 235 are erased during the OFF processing.

If end processing is not to be executed, the body-side control unit 230 makes a negative decision in step S150 and the operation returns to step S130. Once the operation returns to step S130, the body-side control unit 230 repeatedly executes processing similar to the processing described above. It is to be noted that the body-side control unit 230 may execute the processing in step S110 to select the communication partner before executing the processing in step S130.

Processing Executed by the Intermediate Accessory Control/Communication Unit 435 or the Lens-side Control Unit 330 for Regular Command Data Communication Next, in reference to FIG. 9, the processing executed at a camera accessory for regular command data communication will be explained. In the following description, the accessory-side control/communication unit 435 or the lens-side control unit 330 will be consistently referred to as a "camera accessory control unit".

In step S510, the camera accessory control unit receives a command packet 402 for regular command data communication from the body-side control unit 240 and then the operation proceeds to step S520.

In step S520, the camera accessory control unit makes a decision as to whether or not the device ID in the command packet 402 matches its own device ID. If the device ID included in the command packet 402 matches its own device ID, the camera accessory control unit makes an affirmative decision in step S520 and the operation proceeds to step S530. If, on the other hand, the command packet 402 does not include the matching device ID, the camera accessory control unit makes a negative decision in step S520 and the operation proceeds to step S570.

If the command packet 402 is addressed to itself, the camera accessory control unit sets the RDYA signal and DATAA signal outputs or an RDYL signal and a DATAL signal outputs in a communication-enabled state in step S530 before the operation proceeds to step S540. In step S540, the camera accessory control unit, determining that no error has occurred in reception of the command packet 402, shifts the RDYA signal or the RDYL signal from L level to H level and then back to L level before the operation proceeds to step S545. In step S545, the camera accessory control unit starts the first control processing 404 based upon the command packet 402 and then the operation proceeds to step S550.

In step S550, the camera accessory control unit receives a data packet 406 from the body-side control unit 240 and transmits a data packet 407 to the body-side control unit 240 before the operation proceeds to step S560.

In step S560, the camera accessory control unit, determining that no error has occurred in reception of the data packet 406, shifts the RDYA signal or the RDYL signal from L level to H level and then back to L level before the operation proceeds to step S565. In step S565, the camera accessory control unit starts second control processing 408 based upon the control details indicated in the data packet 406 and then the operation returns to step S510.

If the command packet 402 does not include the matching device ID, the camera accessory control unit makes a negative decision in step S520 and the operation proceeds to step S570. The camera accessory control unit cuts off the output of the RDYA signal or the RDYL signal and the output of the DATAA signal or the DATAL signal in step S570, and then the operation returns to step S510.

Third Utilization Example

In the first utilization example and the second utilization example, the potential at the LDET (B) terminal is sustained at the level matching the potential of the source V33 without becoming lower when a non-master lens alone is mounted at the camera body 2 and thus, the camera body 2 does not detect that any camera accessory is mounted. In addition, in the first utilization example and the second utilization example, the body-side control unit 230 detects that the interchangeable lens 3 is mounted by sensing a decrease in the potential at the LDET (B) terminal and by detecting a mounted state via a lens mount/dismount detection pin (not shown) disposed at the body-side mount 210.

As an alternative, the camera body 2 may detect that a camera accessory is mounted even when only a non-master lens is mounted and a master lens is not mounted.

In the following description, a utilization example in which power is turned on with the teleconverter 4 mounted at the camera body 2 and the interchangeable lens 3 is mounted later, will be explained as a third utilization example. In the third utilization example, the device ID assignment command data communication in step S220 and subsequent steps may be started when power is turned on at the camera body 2 and before the interchangeable lens 3 is mounted. In this case, a device ID can be assigned to the teleconverter 4 through processing executed from the time point t10 through the time point t12 with the teleconverter 4 alone mounted at the camera body 2 and once the interchangeable lens 3 is mounted subsequently, a device ID may be assigned to the interchangeable lens 3 alone through processing executed from the time point t12 through the time point t20.

Description of Hotline Communication

The body-side control unit 230 carries out hotline communication with a master lens. The master lens (the interchangeable lens 3 in the embodiment) includes a movable member disposed therein and transmits information indicating the position and the state of movement of the movable member through hotline communication executed independently of command data communication. In hotline communication, a data signal (HDATA signal) and a clock signal (HCLK signal) are unidirectionally transmitted from the lens-side control unit 330 to the body-side control unit 230.

Once a hotline communication start instruction is transmitted through command data communication from the camera body 2 to the interchangeable lens 3, hotline data are transmitted through hotline communication from the lens-side communication unit 340 to the body-side communication unit 240 irrespective (independently) of command data communication until a hotline communication end instruction is transmitted from the camera body 2 to the interchangeable lens 3 through command data communication. The hotline data transmitted from the lens-side communication unit 340 to the body-side communication unit 240 may be information pertaining to conditions in the interchangeable lens 3 and may include position information indicating the position of the focusing lens among the lenses 361, position information indicating the position of a blur correction lens and information indicating the focusing lens control state. Such information is notated as a lens signal 503 in FIG. 5, in reference to which an explanation is provided below.

Figure 5:
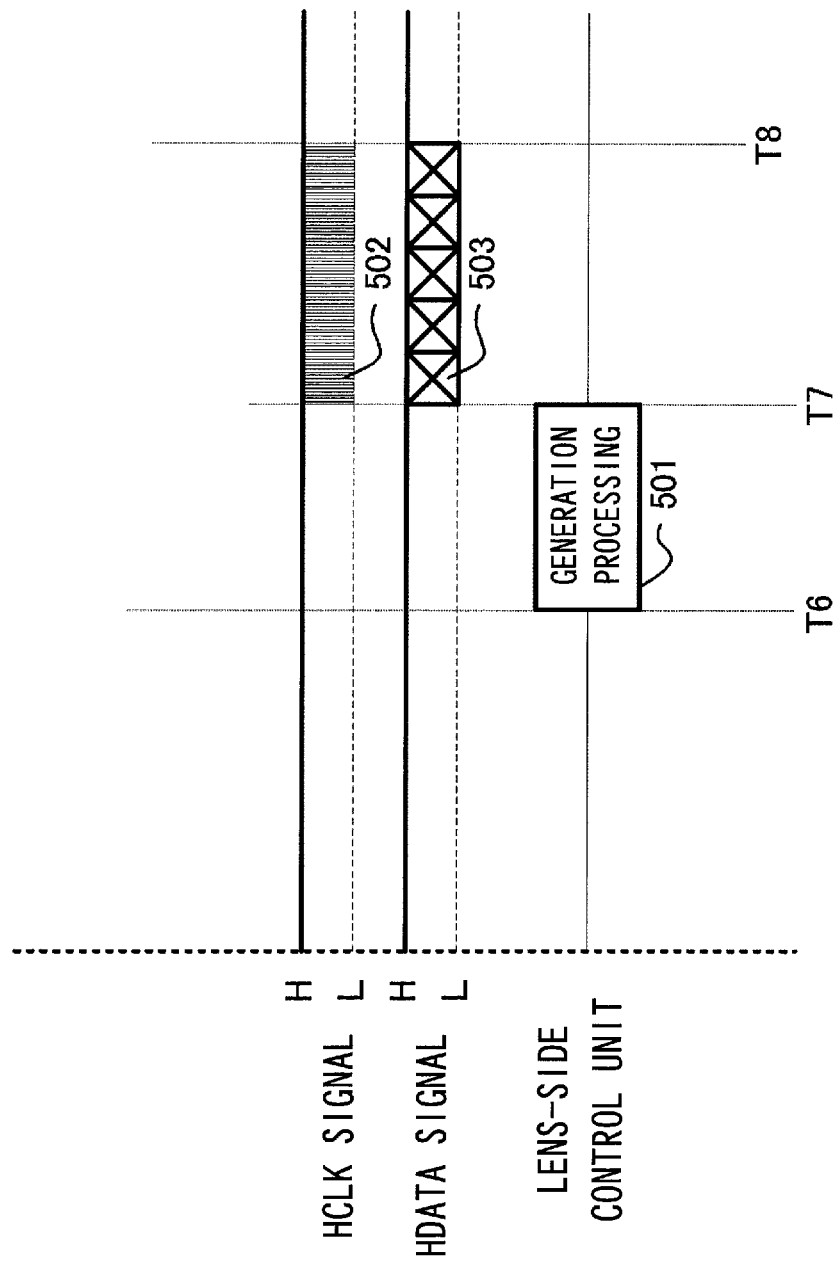
FIG. 5 is a chart presenting an example of timing with which hot-line data communication may be carried out between the body-side communication unit and the lens-side communication unit.

FIG. 5 is a chart presenting an example of timing with which hotline communication may be carried out between the body-side communication unit 240 and the lens-side communication unit 340. Upon receiving a hotline communication start command through command data communication (T6), the lens-side control unit 330 starts data generation processing 501 to generate data related to lens information. The generation processing 501 is processing for obtaining information indicating the conditions at the interchangeable lens 3 at, for instance, a 1 ms sampling cycle and for generating a signal carrying the information thus obtained, i.e., the lens signal 503.

Once the generation of the lens signal 503 by the lens-side control unit 330 is completed (T7), the lens-side communication unit 340 outputs a clock signal 502 through the HCLK (L) terminal. As a result, the clock signal 502 is transmitted from the interchangeable lens 3 to the camera body 2. The frequency of the clock signal 502 may be, for instance, 2.5 MHz.

The lens-side communication unit 340 outputs the lens signal 503 as an HDATA signal in synchronization with the clock signal 502. In FIG. 5, the lens signal 503 is represented by the corresponding H level-L level switchover. Once the transmission of the lens signal 503 is completed (T8), the lens-side communication unit 340 ends the output of the clock signal 502 and returns to a time point T6. The lens-side communication unit 340 repeats the processing from the time point T6 to the time point T8 constituting one hotline cycle.

The lens-side communication unit 340 repeatedly executes the generation processing 501 and the transmission of a lens signal 503 at predetermined time intervals (every millisecond) until a communication end instruction (may otherwise be referred to as a transmission-stop instruction) is transmitted from the camera body 2 through command data communication. It is to be noted that the length of time from the time point T7 through the time point T8 does not exceed a length amounting to 80% of the length of time between the time point T6 and the time point T8. This means that in a single session of hotline communication, the length of time required for transmission of the lens signal 503 will be set to approximately 75% of the entire session and accordingly, the data length of the lens signal 503 is set so that the transmission of the lens signal 503 does not take up a length of time amounting to 80% or more of the entire session of hotline communication. In addition, the lens-side control unit 330 may execute the generation processing 501 independently of the HCLK signal and the HDATA signal. In such a case, the generation processing 501 does not need to be executed during the time period from the time point T6 through the time point T7.

Through the command data communication and the hotline communication described above, communication in one system and communication in another system can be carried out independently of each other, i.e., communication for one system and communication for the other system can be executed concurrently. In other words, the body-side control unit 230 and the lens-side control unit 330 are able to start or end hotline communication while command data communication is in progress. In addition, they are able to carry out command data communication while hotline communication is in progress, as well. Thus, the body-side control unit 230 is able to continuously obtain information pertaining to the interchangeable lens 3 through hotline communication even while command data communication is in progress. Furthermore, since the information pertaining to the interchangeable lens 3 can be continuously obtained through hotline communication, any adverse effect that would occur if transmission/reception of a large volume of data were executed through command data communication is averted.

Moreover, hotline communication enables the body-side control unit 230 to transmit various instructions and requests to the interchangeable lens 3 with any timing and to receive information from the interchangeable lens 3 with any timing.

The following operational effects are achieved through the embodiment described above.

(1) A camera body 2 structured so as to allow a camera accessory, at which light departing the subject enters, to be mounted at or dismounted from the camera body 2, includes body-side terminals and a body-side communication unit 240 that carries out communication with at least one of camera accessories mounted thereat. The body-side communication unit 240 issues, via a communication terminal among the body-side terminals, a request to a teleconverter 4 for a discriminating signal that indicates whether or not another device (e.g., an interchangeable lens 3) capable of communicating with the camera body 2 can be mounted on the front side (subject side) of the teleconverter 4. This structure makes it possible to obtain, from a communication partner device, a discriminating signal indicating whether or not a camera accessory is present on the front side of the communication partner device. The discriminating signal carries information that makes it possible to determine whether the communication partner device is a master lens or a non-master lens, and in the description of the embodiment, this information is defined as information that indicates whether or not another device can be mounted in a communication-enabled state on the subject side of the device.

Since the discriminating signal to be used to determine whether a camera accessory is a master lens or a non-master lens is transmitted from the camera accessory itself, a special terminal via which the camera accessory is determined to be a master lens or a non-master lens does not need to be included at the camera body 2 and furthermore, the need to distinguish a camera accessory as a master lens or a non-master lens based upon model name information or the like of the camera accessory is eliminated. Since a dedicated terminal exclusively used to distinguish a camera accessory as a master lens or a non-master lens is not required, the mount units of the camera body 2 and the camera accessory can be miniaturized. Moreover, since a master lens and a non-master lens are allowed to have matching numbers of terminals, their mount units can be miniaturized. Moreover, since the camera body 2 does not need to distinguish a camera accessory as a master lens or a non-master lens based upon the model name information or the like pertaining to the camera accessory, it is not necessary to store the model name information for all the camera accessories that can be mounted at the camera body 2 and even a newer camera accessory developed and made commercially available later than the camera body 2 can be distinguished as a master lens or a non-master lens.

(2) The camera body 2 includes a storage unit in which device IDs used to identify the interchangeable lens 3 and the teleconverter 4 are stored. This structure makes it possible to manage device IDs of the camera accessories connected to the camera body 2 in an optimal manner.

(3) The body-side communication unit 240 indicates the device ID 2 assigned to the interchangeable lens 3 in a command packet 402 and indicates the device ID 1 assigned to the teleconverter 41 in a command packet 402. Since device ID assignment command data communication and regular command data communication are not executed concurrently, optimal assignment of device IDs to individual communication partners is enabled and then a desired communication partner can be specified simply by indicating its device ID in subsequent regular command data communication. In addition, in command data communication, the control unit of a camera accessory transmits a data packet 407 concurrently as it receives a data packet 406. By allowing data packets to be transmitted/received bidirectionally, unlike command packets 402, which are transmitted unidirectionally, a data communication means via which data are transmitted from a camera accessory to the camera body 2 can be assured for command data communication as well.

Furthermore, a device ID is assigned each time power is turned on or each time an accessory is mounted/dismounted, with a device mounted closest to the camera body 2 assigned with the device ID first in the embodiment. This means that the camera body 2 does not always assign the same device ID to a given camera accessory.

(4) The body-side communication unit 240 carries out regular command data communication by using device IDs. As a result, it is able to transmit an instruction to a communication partner in an optimal manner by specifying the instruction recipient with its device ID. If no device ID were assigned, it would be necessary to make a decision within a camera accessory as to whether or not an instruction issued by the camera body 2 had been addressed to itself, which would result in a delay occurring before the recipient camera accessory received the instruction when a plurality of camera accessories were mounted. In addition, if no device ID were assigned, it might not be possible to determine within a camera accessory whether or not an instruction issued by the camera body 2 was addressed to itself and in such a case, it would not be possible for the intended recipient camera accessory to receive the instruction. However, the recipient camera accessory is able to receive the instruction with optimal timing in the embodiment.

(5) The body-side communication unit 240 ends device ID assignment command data communication upon detecting that a discriminating signal, which indicates whether or not another device capable of communicating with the camera body 2 can be mounted on the front side (subject side) of a camera accessory, indicates that such a device cannot be mounted. Once the device ID assignment command data communication ends, the body-side control unit 230 transmits to the camera accessory an instruction for, for instance, an initialization processing start, through regular command data communication. Through the initialization processing, a drive target member such as a lens 361 may be caused to move to the initial position.

In the embodiment, device ID assignment command data communication is terminated upon receiving a discriminating signal indicating that another device cannot be mounted on the front side, and thus, device IDs can be assigned to all the camera accessories mounted at the camera body 2. Since regular command data communication can be started after device IDs are assigned to all the camera accessories currently mounted at the camera body 2, communication can be carried out with all the camera accessories mounted in a communication-enabled state by using their device IDs.

(6) If the discriminating signal indicates that another device capable of communicating with the camera body 2 can be mounted on the front side (subject side) of a camera accessory, the body-side communication unit 240 carries out communication with the other device via the camera accessory. This structure enables the interchangeable lens 3 to carry out communication with the camera body 2 via the teleconverter 4, which eliminates the need for the interchangeable lens 3 to include terminals for communicating with the camera body 2 and separate terminals for communicating with the teleconverter 4, making it possible to miniaturize its mount unit.

(7) The body-side communication unit 240 provides the interchangeable lens 3 with a device ID assigned thereto via a terminal at the teleconverter 4. This structure makes it possible to notify a camera accessory of the device ID assigned thereto in an optimal manner even when an intermediate accessory is mounted.

(8) The body-side communication unit 240, having started device ID assignment command data communication, provides a camera accessory (the teleconverter 4 in the embodiment) to be assigned with a device ID first, with an instruction indicating a device ID 1 and then provides a camera accessory (the interchangeable lens 3 in the embodiment) to be assigned with an identifier next, with an instruction indicating a device ID 2. The device ID 1 is used by the teleconverter 4 in order to recognize an instruction issued to itself by distinguishing it from an instruction intended for the interchangeable lens 3. The device ID 2 is used by the interchangeable lens 3 in order to recognize an instruction issued to itself by distinguishing it from an instruction intended for the teleconverter 4. Since different device IDs are assigned to a plurality of camera accessories sequentially, starting with the camera accessory mounted closest to the camera body 2 as described above, device IDs can be assigned in an optimal manner to a plurality of communication partners.

(9) The camera body 2 includes a source unit 250 from which power is supplied to a source circuit 452 of the teleconverter 4 mounted thereat and to a source circuit 352 of the interchangeable lens 3 mounted thereat. This structure makes it possible to provide electric power from a single source unit 250 at the camera body 2 in an optimal manner to a plurality of communication partners.

(10) Camera accessories at which light from a subject enters can be detachably mounted at the camera body 2. For instance, the teleconverter 4, which includes an accessory-side control/communication unit 435 engaged in communication with the camera body 2 and a storage unit 437, in which a discriminating signal (e.g., 01) indicating that another camera accessory (such as the interchangeable lens 3) capable of communicating with the camera body 2 can be mounted on the front side (i.e., the subject side) of the teleconverter 4, is stored, transmits the discriminating signal to the camera body 2 via the accessory-side control/communication unit 435. In addition, the interchangeable lens 3, which includes a lens-side communication unit 340 engaged in communication with the camera body 2 and a lens-side storage unit 350, in which a discriminating signal (e.g., 00), indicating that another camera accessory capable of communicating with the camera body 2 cannot be mounted on the front side (subject side) of the interchangeable lens 3, is stored, transmits the discriminating signal to the camera body 2 via the lens-side communication unit 340. This structure makes it possible for the camera body 2 to recognize whether or not another camera accessory can be mounted in a communication-enabled state on the front side of a given camera accessory.

(11) A camera accessory at which light from a subject enters can be detachably mounted at the camera body 2 and includes a communication unit engaged in communication with the camera body 2. At the camera accessory, a discriminating signal indicating whether or not another device capable of communicating with the camera body 2 can be mounted on the subject side of the particular camera accessory is stored, and the communication unit transmits the discriminating signal to the camera body 2. In other words, a discriminating signal indicating that another device capable of communicating with the camera body 2 cannot be mounted on the subject side thereof is stored at a master lens, whereas a discriminating signal indicating that another device capable of communicating with the camera body 2 can be mounted on the subject side thereof is stored at a non-master lens. Thus, information indicating whether or not another camera accessory in a communication-enabled state is present on the subject side of a camera accessory can be provided to the camera body 2 in an optimal manner. Since such a discriminating signal is stored in each camera accessory, an advantage is achieved in that information indicating whether each camera accessory is a master lens or a non-master lens does not need to be stored in the camera body.

(12) Camera accessories each include a storage unit in which a device ID to be used to distinguish it from other camera accessories is stored. Thus, each camera accessory is able to hold its device ID in an optimal manner and receive an instruction issued from the camera body 2 in an optimal manner.

(13) A camera accessory includes a decision-making unit (the accessory-side control/communication unit 435 in the teleconverter 4 and the lens-side control unit 330 in the interchangeable lens 3) that makes a decision as to whether or not a command packet 402 transmitted from the camera body 2 includes the device ID assigned thereto and stored in its storage unit. This structure makes it possible for the camera accessory to determine whether a command packet 402 transmitted from the camera body 2 is intended for the particular camera accessory or for another camera accessory in an optimal manner.

(14) A camera accessory, recognizing its own device ID included in a command packet 402, determines that it has been specified as a communication partner for command data communication and receives a data packet 406. If it received a data packet 406 containing a device ID different from its own device ID, a drive instruction issued from the camera body 2 might not be successfully executed at the intended camera accessory or a data packet 407 might be transmitted to the camera body 2 from an unintended camera accessory. Through the embodiment adopting the structure described above, a command packet 402 intended for a given camera accessory and a subsequent data packet 406 transmitted from the camera body 2, can be received at the correct recipient.

(15) A camera accessory, recognizing that the device ID assigned thereto is not included in a command packet 402, sets its communication terminals in a high impedance state and thus does not receive a data packet 406. Through these measures, it is ensured that a camera accessory does not receive a data packet 406 if an instruction or a request transmitted from the camera body 2 is intended for a different camera accessory.

(16) A camera accessory includes lens-side terminals disposed on a side (image-capturing surface side) opposite from the subject side. The accessory-side control/communication unit 435 and the lens-side communication unit 340 each carry out communication with the camera body 2 via the lens-side terminals.

(17) The teleconverter 4 includes body-side terminals via which communication with the interchangeable lens 3 is carried out, disposed on the subject side thereof, lens-side terminals disposed on the side opposite from the subject side along an optical axis O, signal lines connecting the lens-side terminals with the body-side terminals, and an accessory-side control/communication unit 435 capable of switching to a communication-enabled state (signal output state) or to a communication-abandoned (or disabled) state (high impedance state in which signals are not output) with respect to communication via a signal line. This structure makes it possible to prevent a collision of, for instance, an RDYL signal output from the interchangeable lens 3 and an RDYA signal output from the teleconverter 4, from occurring on the signal line.

(18) The teleconverter 4 and the interchangeable lens 3 each include an optical system through which light originating on the subject side passes.

(19) The teleconverter 4 includes a plurality of lens-side terminals disposed at a rear-side terminal holding unit 422 located on the side where the camera body 2 is present, a plurality of body-side terminals disposed at a front-side terminal holding unit 423 located on the side where the interchangeable lens 3 is mounted, at least one power supply signal line that connects at least one lens-side terminal with at least one body-side terminal, and a switch 450 via which the power supply signal line is opened/closed.

In the embodiment, the number (11) of connector terminals via which the camera body 2 and the interchangeable lens 3 are connected with each other matches the number (11) of connector terminals via which the teleconverter 4 and the interchangeable lens 3 are connected with each other, and no any extra terminals are required.

The camera body 2 at which the teleconverter 4 is mounted includes a body-side terminal group and a source unit 250 from which electric power is provided to the teleconverter 4 via a V33 (B) terminal to be connected to the power supply signal line on which the switch 450 is disposed at the teleconverter 4. Thus, under a condition in which the switch 450 is in an open state, the body-side control unit 230 provides electric power from the camera body 2 to the teleconverter 4, whereas under a condition in which the switch 450 is in a closed state, the body-side control unit 230 is able to provide electric power from the camera body 2 to both the teleconverter 4 and the interchangeable lens 3.

(20) The camera body 2 further includes a body-side communication unit 240 engaged in communication with the accessory-side control/communication unit 435 via a communication terminal in the body-side terminal group. In response to a shift occurring in the RDYA signal or the RDYL signal from L level to H level and then back to L level, the body-side communication unit 240 starts device ID assignment command data communication. This structure makes it possible for the camera body 2 to assign a device ID to a camera accessory after the camera accessory provided with electric power enters a communication-enabled state.

(21) In the first utilization example, the source unit 250 provides electric power to the interchangeable limbs 3 via the V33 (B) terminal for power supply once second control processing 408 is completed through device ID assignment command data communication and the switch 450 enters a closed state. In addition, the body-side communication unit 240 engages in communication with the lens-side communication unit 340 via its communication terminal and in response to a shift (L level→H level→L level) in the RDYL signal indicating whether or not command data communication is enabled, provided from the interchangeable lens 3, it transmits a command packet 402 containing a device ID to the interchangeable lens 3. Thus, the camera body 2 is able to assign a device ID to the interchangeable lens 3 after the interchangeable lens 3, provided with electric power, enters a communication-enabled state.

(22) A camera accessory mounted at the camera body 2 includes a communication unit engaged in communication with the body-side communication unit 240 via a communication terminal. The communication unit in the camera accessory individually switches the RDYL signal or the RDYA signal and the DATAL signal or the DATAA signal to a communication-abandoned state (high impedance state) or to a communication-enabled state. This structure makes it possible to prevent a collision of, for instance, the RDYL signal output from the interchangeable lens 3 and the RDYA signal output from the teleconverter 4 from occurring on the signal line.

(23) The communication unit of a camera accessory individually sets input portions (communication terminals DATAB and CLK), to which a DATAB signal and a CLK signal from the camera body 2 are input, to a communication-enabled state. As a result, the CLK signal and the DATAB signal output from the camera body 2 can be received at the interchangeable lens 3 and at the teleconverter 4 in an optimal manner.

(24) In response to a command packet 402 input thereto from the camera body 2, containing the device ID assigned to a specific camera accessory, the communication unit of the particular camera accessory switches output portions (communication terminals RDY (L) and DATAL (L)) to a communication-enabled state. In other words, the communication unit switches the output portions to a communication-enabled state only after receiving a command packet 402 containing the device ID assigned thereto. Thus, it is possible to prevent, in an optimal manner, a collision of a signal (RDYL or DATAL) output from the interchangeable lens 3 and a signal (RDYA or DATAA) output from the teleconverter 4, from occurring on the signal line.

(25) When a command packet 402 from the camera body 2 containing a device ID assigned to another camera accessory is input to the communication unit of a camera accessory, i.e., when a command packet 402 containing the device ID assigned to itself is not input to the input portion, the communication unit of the camera accessory switches the output portions (the communication terminals RDY (L) and DATAL (L)) to a communication-abandoned state (high impedance state). Thus, it is possible to prevent, in an optimal manner, a collision of a signal (RDYL or DATAL) output from, for instance, the interchangeable lens 3 and a signal (RDYA or DATA) output from the teleconverter 4 from occurring on the signal line.

(26) The teleconverter 4 mounted between the camera body 2 and the interchangeable lens 3 includes lens-side terminals disposed at a rear-side terminal holding unit 422 located on the side where the camera body 2 is present, body-side terminals disposed at a front-side terminal holding unit 423 located on the side where the interchangeable lens 3 is mounted, a plurality of signal lines via each of which a lens-side terminal and a body-side terminal are connected with each other, and a switch 450 disposed on one of the signal lines to open/close the signal line. This structure makes it possible to, for instance, cut off a signal line extending from the camera body 2 to the interchangeable lens 3 and achieve electric continuity for only a signal line extending from the camera body 2 to the teleconverter 4 when the switch 450 is in an open state and to achieve electric continuity, via the teleconverter 4, for the signal line extending from the camera body 2 to the interchangeable lens 3 when the switch 450 is in a closed state.

(27) At the teleconverter 4, the switch 450 is disposed on at least a signal line through which power is provided from the source unit 250 at the camera body 2, among the plurality of signal lines. This structure makes it possible to supply electric power from the camera body 2 to the teleconverter 4 while the switch 450 is in an open state. In addition, when the switch 450 is in a closed state, electric power can be provided from the camera body 2 to both the teleconverter 4 and the interchangeable lens 3.

(28) The switch 450 at the teleconverter 4 described above is a normally open contact point, and thus, electric power is provided to the teleconverter 4 alone from the camera body 2 in an initial state in which the switch 450 is open, whereas electric power can be provided from the camera body 2 to both the teleconverter 4 and the interchangeable lens 3 when the switch 450 is in a closed state.

(29) The accessory-side control/communication unit 435 at the teleconverter 4 described above closes the switch 450 after setting the output portions corresponding to the communication signal lines (the signal lines for the RDYA signal and the DATAA signal) to a communication-abandoned state (high impedance state). Thus, even if an RDYL signal from the interchangeable lens 3, to which electric power is provided via the switch 450 in a closed state, is output to a communication signal line, the RDYL signal can be prevented from colliding with an RDYA signal to be output from the output portion of the teleconverter 4, on the signal line.

(30) The camera body 2 first assigns device IDs to all the camera accessories mounted thereat in a communication-enabled state and then engages the body-side communication unit 240 to transmit a command packet 402 and a data packet 406 by specifying a device ID through regular command data communication. This structure enables the camera body 2 to specify a communication partner and engage in communication with the device assigned with a device ID matching the specified device ID.

The following variations are also within the scope of the present invention, and one of the variations or a plurality of variations may be adopted in combination with the embodiments described above.

While the camera body 2 in the embodiment is a mirrorless-type camera body, the present invention may be adopted in conjunction with a single lens reflex-type camera body, instead.

A storage unit in the embodiment may be either a volatile storage unit or a non-volatile storage unit. A device ID may be held for temporary storage in the control units (the body-side control unit 230, the accessory-side control/communication unit 435, the lens-side control unit 330), or it may be temporarily stored in the storage units (the storage units 235, 437, 350). It is to be noted that the device ID only needs to be stored while the particular accessory is mounted, and the device ID does not need to be continuously stored after the accessory is dismounted or after power is turned off.

While the lens drive unit 370 in the embodiment drives the focusing lens along the optical axis O, the present invention is not limited to this example and it may drive another member. The plurality of lenses 361 may include a zoom lens, and in such a case, a zoom drive unit may be disposed as a lens drive unit 370. In addition, the plurality of lenses 361 may include a blur correction lens used to minimize the adverse effects of blur attributable to shaky hand movement or the like and, in such a case, a blur correction drive unit may be disposed as a lens drive unit 370.

While electric power sourced from a drive system voltage is provided to the interchangeable lens 3 only and is not provided to the teleconverter 4 in the embodiment described above, drive system power may also be provided to the teleconverter 4.

While a single command packet 402 includes both a device ID assignment instruction for a camera accessory and an instruction for the camera accessory to transmit a discriminating signal in the embodiment described above, these instructions may instead be transmitted over two separate command packets. In such a case, the camera accessory will separately prepare a data packet 407 containing the model name information and a data packet 407 containing the discriminating signal.

While device IDs are assigned to all the camera accessories mounted at the camera body 2 in the order they are connected to the camera body 2 (i.e., in the order starting with the camera accessory connected at the position closest to the camera body 2) in the embodiment described above, the present invention is not limited to this example. In the embodiment, when the teleconverter 4 and the interchangeable lens 3 are mounted at the camera body 2 as shown in FIG. 2 and FIG. 3, the body-side control unit 230 assigns a device ID to the teleconverter 4 first, and then assigns a device ID to the interchangeable lens 3. This order remains applicable (unchanged) regardless of whether the interchangeable lens 3 is mounted at the teleconverter 4 after the teleconverter 4 only has been mounted at the camera body 2 and has thus become connected with the camera body 2 as one or the teleconverter 4 having become connected as one with the interchangeable lens 3 after the interchangeable lens 3 has been mounted at the teleconverter 4, is then mounted at the camera body 2.

While power-on processing is executed and device ID assignment command data communication is initiated in response to a power-on operation in the embodiment, the present invention is not limited to this example.

While the teleconverter 4 represents an example of a non-master lens in the embodiment described above, a non-master lens does not need to be the teleconverter 4. The non-master lens may instead be a wide converter, a close-up ring or the like. Namely, the teleconverter 4 may adopt any mode as long as it constitutes an intermediate accessory that is mounted between the camera body 2 and a master lens. It is to be noted that while a lens hood, a front converter and the like can be mounted on the subject side of the master lens, they are not engaged in communication with the camera body 2 and thus, will not be a device mounted in a communication-enabled state. In addition, an adapter that converts communication specifications to comply with those of the camera body 2 is another example of a master lens. An interchangeable lens conforming to a different set of communication specifications is mounted on the subject side of such an adapter, which engages in communication with the camera body 2 to transmit an instruction for the interchangeable lens conforming to the different set of communication specifications by converting the communication specifications corresponding to the camera body 2. Accordingly, the adapter may be regarded to function as a master lens with respect to communication.

It is to be noted that when a device is mounted in a communication-enabled state, the device is able to receive an instruction issued from the camera body 2 and make a correct response to the instruction. This means that members such as a lens cap and a hood that can be physically mounted on the subject side of a camera accessory are not "camera accessories that can be mounted in a communication-enabled state" in the embodiment. In addition, while an interchangeable lens conforming to a different set of communication specifications can be mounted at the camera body 2 via a mount adapter, the interchangeable lens conforming to the different communication specifications will not be able to make a correct response to an instruction directly received from the camera body 2 and the instruction from the camera body 2 will need to be converted at the mount adapter. For this reason, the interchangeable lens conforming to the different set of communication specifications is not regarded as a "camera accessory that can be mounted in a communication-enabled state" in the embodiment.

In the embodiment, the accessory-side control/communication unit 435 is not connected with the HCLK (B) terminal, the HCLK (L) terminal, the HDATA (B) terminal and the HDATA (L) terminal. This means that the sole communication partner of the camera body 2 in hotline communication is the interchangeable lens 3, and the camera body 2 and the interchangeable lens 3 maintain a one-to-one relationship. Accordingly, the device ID of the communication partner for hotline communication is not specified, although the present invention is not limited to this example.

In the embodiment, a single teleconverter 4 is mounted as an intermediate accessory, however, a plurality of intermediate accessories may be mounted. In addition, an upper limit (e.g., 2) may be set with respect to the number of intermediate camera accessories that can be mounted.

While an embodiment and variations thereof have been described above, the present invention is in no way limited to the particulars of these examples. Any other mode conceivable within the scope of the technical teaching of the present invention is also within the scope of the present invention.

REFERENCE SIGNS LIST

1 . . . camera system, 2 . . . camera body, 3 . . . interchangeable lens, 4 . . . accessory, 210 . . . body-side mount, 230 . . . body-side control unit, 235 . . . storage unit, 240 . . . body-side communication unit, 270 . . . signal processing unit, 310 . . . lens-side mount, 330 . . . lens-side control unit, 340 . . . lens-side communication unit, 350 . . . lens-side storage unit, 352, 452 . . . source circuit, 360 . . . image-capturing optical system, 402 . . . command packet, 406, 407 . . . data packet, 412 . . . rear-side mount, 413 . . . front-side mount, 435 . . . control/communication unit, 437 . . . storage unit, 450 . . . switch, 460 . . . lens

The invention claimed is:

1. A camera body to which one or more camera accessories, at which light from a subject enters, are detachably mountable, comprising:
 a body-side terminal; and
 a communication unit that communicates with at least one of the camera accessories, wherein:
 the communication unit
  requests, via the body-side terminal, the camera accessory to provide a discriminating signal indicating whether or not another camera accessory capable of communicating with the camera body is mountable on a subject side of the camera accessory, and
  provides, via the body-side terminal, the camera accessory with a first identifier used to distinguish the camera accessory that is mountable to the camera body and capable of communicating with the camera body from the other camera accessory.

2. The camera body according to claim 1, further comprising:
 a storage unit that stores the first identifier used to distinguish between the camera accessory and the other camera accessory.

3. The camera body according to claim 1, wherein:
 the communication unit transmits an instruction to the camera accessory by using the first identifier.

4. The camera body according to claim 1, wherein:
 if the discriminating signal indicates that the other camera accessory cannot be mounted on the subject side, the communication unit issues an instruction to the camera accessory for initialization processing after providing the first identifier.

5. The camera body according to claim 1, wherein:
 if the discriminating signal indicates that the other camera accessory can be mounted on the subject side of the camera accessory, the communication unit communicates with the other camera accessory via the camera accessory.

6. The camera body according to claim 5, wherein:
 the communication unit provides the other camera accessory with a second identifier used to identify the other camera accessory.

7. The camera body according to claim 6, wherein:
 the communication unit
  provides the other camera accessory with the second identifier used to distinguish the other camera accessory from the camera accessory after providing the camera accessory with the first identifier used to distinguish the camera accessory from the other camera accessory.

8. The camera body according to claim 1, further comprising:
 a power supply unit that provides electric power to the camera accessory mounted thereto.

9. An interchangeable lens that is detachably mountable at a camera body, comprising:
- an optical system at which light from a subject enters; and
- a reception unit that receives an instruction signal transmitted from the camera body, wherein:
- the instruction signal carries an identifier used to identify the interchangeable lens and an instruction issued from the camera body.

10. The interchangeable lens according to claim 9, wherein:
- the identifier is used to distinguish between the interchangeable lens and another device mounted at the camera body and capable of communicating with the camera body.

11. The interchangeable lens according to claim 9, wherein:
- the identifier indicates an order of devices mounted at a body-side mount of the camera body.

* * * * *